United States Patent
Koumura et al.

(10) Patent No.: US 12,462,142 B2
(45) Date of Patent: Nov. 4, 2025

(54) IMAGING DEVICE UTILIZING A NEURAL NETWORK

(71) Applicant: SEMICONDUCTOR ENERGY LABORATORY CO., LTD., Atsugi (JP)

(72) Inventors: Yusuke Koumura, Kanagawa (JP); Koki Inoue, Kanagawa (JP); Ayana Kimotsuki, Kanagawa (JP); Fumiya Nagashima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 941 days.

(21) Appl. No.: 17/629,499

(22) PCT Filed: Jul. 30, 2020

(86) PCT No.: PCT/IB2020/057181
§ 371 (c)(1),
(2) Date: Jan. 24, 2022

(87) PCT Pub. No.: WO2021/028762
PCT Pub. Date: Feb. 18, 2021

(65) Prior Publication Data
US 2022/0292332 A1    Sep. 15, 2022

(30) Foreign Application Priority Data
Aug. 9, 2019    (JP) ................. 2019-146985

(51) Int. Cl.
*G06N 3/045*    (2023.01)
*G06N 3/063*    (2023.01)
(Continued)

(52) U.S. Cl.
CPC ............. *G06N 3/045* (2023.01); *G06N 3/063* (2013.01); *G06T 1/60* (2013.01); *G06T 7/50* (2017.01)

(58) Field of Classification Search
CPC ........ G06N 3/045; G06N 3/063; G06N 20/00; G06N 20/10; G06N 20/20; G06N 3/08;
(Continued)

(56) References Cited

U.S. PATENT DOCUMENTS 7,369,162 B2    5/2008  Yagi et al.
8,378,391 B2    2/2013  Koyama et al.
(Continued)

FOREIGN PATENT DOCUMENTS

CN    108446631 A  *  8/2018 ............. G06N 3/045
CN    109964237 A     7/2019
(Continued)

OTHER PUBLICATIONS https://machinelearningmastery.com/convolutional-layers-for-deep-learning-neural-networks/ (Year: 2020).*
(Continued)

*Primary Examiner* — Steven P Sax
(74) *Attorney, Agent, or Firm* — NIXON PEABODY LLP; Jeffrey L. Costellia

(57) ABSTRACT

A system with high processing speed and low power consumption is provided. The system includes an imaging device and an arithmetic circuit. The imaging device includes an imaging portion, a first memory portion, and an arithmetic portion, and the arithmetic circuit includes a second memory portion. The imaging portion has a function of converting light reflected by an external subject into image data, and the first memory portion has a function of storing the image data and a first filter for performing first convolutional processing in a first layer of a neural network.
(Continued)

The arithmetic portion has a function of performing the first convolutional processing using the image data and the first filter to generate first data. The second memory portion has a function of storing the first data and a plurality of filters. The arithmetic circuit has a function of generating a depth map of the image data.

5 Claims, 15 Drawing Sheets

(51) Int. Cl.
  *G06T 1/60* (2006.01)
  *G06T 7/50* (2017.01)
(58) Field of Classification Search
  CPC .......... G06T 7/50; G06T 1/60; G06T 7/0012; G06T 3/40; G06T 15/205; G06T 2207/20084; G06F 18/214; G06F 18/241
  See application file for complete search history.

(56) References Cited

U.S. PATENT DOCUMENTS

| | | | |
|---|---|---|---|
| 8,916,869 B2 | 12/2014 | Koyama et al. | |
| 9,331,112 B2 | 5/2016 | Koyama et al. | |
| 9,773,814 B2 | 9/2017 | Koyama et al. | |
| 10,141,069 B2 | 11/2018 | Ikeda et al. | |
| 10,839,535 B2* | 11/2020 | Javidnia | G06T 7/593 |
| 10,929,996 B2 | 2/2021 | Angelova et al. | |
| 2005/0062853 A1 | 3/2005 | Yagi et al. | |
| 2016/0343452 A1 | 11/2016 | Ikeda et al. | |
| 2017/0278289 A1* | 9/2017 | Marino | G06T 7/536 |
| 2018/0218254 A1* | 8/2018 | Feng | G06N 20/00 |
| 2019/0069117 A1* | 2/2019 | Sahay | G08B 3/10 |
| 2019/0164620 A1 | 5/2019 | Ikeda et al. | |
| 2019/0303715 A1* | 10/2019 | Jiang | G06N 3/084 |
| 2019/0373264 A1* | 12/2019 | Chong | H04N 19/91 |
| 2020/0301013 A1* | 9/2020 | Banerjee | G01S 17/931 |
| 2021/0042946 A1* | 2/2021 | Groh | B60W 60/001 |
| 2021/0183089 A1* | 6/2021 | Wadhwa | G06T 7/557 |
| 2021/0233265 A1 | 7/2021 | Angelova et al. | |

FOREIGN PATENT DOCUMENTS

| | | | | |
|---|---|---|---|---|
| CN | 111328419 A | * | 6/2020 | ....... G06F 18/24133 |
| CN | 110263813 B | * | 12/2020 | |
| CN | 109784489 B | * | 7/2021 | |
| CN | 110458797 B | * | 5/2023 | ............. G06K 9/342 |
| CN | 111833363 B | * | 10/2023 | ........... G06F 18/214 |
| CN | 109961072 B | * | 6/2024 | ......... G06F 18/2413 |
| EP | 3709271 A | | 9/2020 | |
| JP | 2019-530926 | | 10/2019 | |
| TW | 1694414 B | * | 5/2020 | |
| WO | WO-2018/052875 | | 3/2018 | |

OTHER PUBLICATIONS

International Search Report (Application No. PCT/IB2020/057181) Dated Oct. 6, 2020.
Written Opinion (Application No. PCT/IB2020/057181) Dated Oct. 6, 2020.
Eigen.D et al., "Depth Map Prediction from a Single Image using a Multi-Scale Deep Network", arXiv:1406.2283v1, Jun. 9, 2014, pp. 1-9, New York University.

* cited by examiner $D_a[1,1] = g[1,1]f_a[1,1] + g[1,2]f_a[1,2] + \cdots + g[t,s]f_a[t,s]$

IMAGING DEVICE UTILIZING A NEURAL NETWORK

TECHNICAL FIELD

One embodiment of the present invention relates to a system.

Note that one embodiment of the present invention is not limited to the above technical field. The technical field of the invention disclosed in this specification and the like relates to an object, a driving method, or a manufacturing method. Alternatively, one embodiment of the present invention relates to a process, a machine, manufacture, or a composition of matter. Therefore, specific examples of the technical field of one embodiment of the present invention disclosed in this specification include a semiconductor device, a display device, a liquid crystal display device, a light-emitting device, a power storage device, an imaging device, a memory device, a signal processing device, a processor, an electronic device, a system, a driving method thereof, a manufacturing method thereof, and a testing method thereof.

BACKGROUND ART

Integrated circuits that imitate the mechanism of the human brain are currently under active development. The integrated circuits incorporate electronic circuits as the brain mechanism and include circuits corresponding to "neurons" and "synapses" of the human brain. Such integrated circuits may therefore be called "neuromorphic", "brain-morphic", or "brain-inspired" circuits. The integrated circuits have a non-von Neumann architecture and are expected to be able to perform parallel processing with extremely low power consumption as compared with a von Neumann architecture, in which power consumption increases with increasing processing speed.

An information processing model that imitates a biological neural network including "neurons" and "synapses" is called an artificial neural network (ANN). By using an artificial neural network, inference with an accuracy as high as or higher than that of a human can be carried out. In an artificial neural network, the main arithmetic operation is the weighted sum operation of outputs from neurons, i.e., the product-sum operation.

With the use of a TOF (Time Of Flight) camera, a stereo camera, or the like, an image having a distance in a depth direction (referred to as a depth in this specification and the like), i.e., an image capable of space perception (a three-dimensional image) can be obtained. In addition, a technique of estimating a depth from an image and adding the depth to the image (referred to as a depth estimation technique in this specification and the like) using the above artificial neural network instead of a TOF camera, a stereo camera, or the like is currently under active development. For example, Non-Patent Document 1 discloses a technique of estimating a depth from an image using two networks: Global Coarse-Scale Network and Local Fine-Scale Network.

REFERENCE

Non-Patent Document

[Non-Patent Document 1] D. Eigen et al., "Depth Map Prediction from a Single Image using a Multi-Scale Deep Network", (Submitted on 9 Jun. 2014) [online], [searched on Jul. 26, 2019], Internet <URL: https://arxiv.org/pdf/1406.2283v1.pdf>

SUMMARY OF THE INVENTION

Problems to be Solved by the Invention

A TOF camera needs to be provided with a light source for irradiation with near-infrared light, for example, and a stereo camera needs to be provided with two or more lenses, for example. That is, a TOF camera, a stereo camera, or the like includes a component for obtaining a depth, and thus is larger than a general camera in some cases.

In the case where arithmetic operation of an artificial neural network used for the depth estimation of an image is performed using an arithmetic unit composed of digital circuits, there is a need to carry out multiplication of digital data (multiplier data) that is a multiplier and digital data (multiplicand data) that is a multiplicand by a digital multiplication circuit and to carry out addition of digital data (product data) obtained in the multiplication by a digital addition circuit so that digital data (product-sum data) is obtained as the result of the product-sum operation. The digital multiplication circuit and the digital addition circuit preferably have specifications that allow multi-bit operation; however, in that case, the digital multiplication circuit and the digital addition circuit each need to have a large circuit scale, resulting in a larger circuit area and increased power consumption in some cases. Furthermore, the larger circuit area might decrease the processing speed of the whole operation.

An object of one embodiment of the present invention is to provide a system capable of product-sum operation. Another object of one embodiment of the present invention is to provide a system with low power consumption. Another object of one embodiment of the present invention is to provide a system with high processing speed.

Another object of one embodiment of the present invention is to provide a novel system. Another object of one embodiment of the present invention is to provide a novel operation method of a system.

Note that the objects of one embodiment of the present invention are not limited to the objects listed above. The objects listed above do not preclude the existence of other objects. Note that the other objects are objects that are not described in this section and are described below.

The objects that are not described in this section are derived from the descriptions of the specification, the drawings, and the like and can be extracted as appropriate from the descriptions by those skilled in the art. Note that one embodiment of the present invention is to achieve at least one of the objects listed above and the other objects. Note that one embodiment of the present invention does not necessarily achieve all the objects listed above and the other objects.

Means for Solving the Problems (1)

One embodiment of the present invention is a system including an imaging device and an arithmetic circuit. The imaging device includes an imaging portion, a first memory portion, and an arithmetic portion, and the arithmetic circuit includes a second memory portion. The imaging portion has a function of converting light reflected by an external subject into image data. The first memory portion has a function of storing the image data and a first filter for performing first convolutional processing in a first layer of a first neural network. The arithmetic portion has a function of performing the first convolutional processing on the image data using the first filter to generate first data. The second memory portion has a function of storing the first data and a plurality of filters for performing convolutional processing in and after a second layer of the first neural network. The arithmetic circuit has a function of performing processing in and after the second layer of the first neural network using the first data to generate a depth map of the image data.

(2)

One embodiment of the present invention having the above structure (1) may further include a memory device. In particular, the memory device preferably has a function of storing the first filter and the plurality of filters, a function of transmitting the first filter to the first memory portion, and a function of transmitting the plurality of filters to the second memory portion.

(3)

Another embodiment of the present invention is a system including an imaging device and an arithmetic circuit. The imaging device includes an imaging portion, a first memory portion, and an arithmetic portion, and the arithmetic circuit includes a second memory portion. The imaging portion has a function of converting light reflected by an external subject into image data. The first memory portion has a function of storing the image data, a first filter for performing first convolutional processing in a first layer of a first neural network, and a second filter for performing second convolutional processing in a first layer of a second neural network. The arithmetic portion has a function of performing the first convolutional processing on the image data using the first filter to generate first data and a function of performing the second convolutional processing on the image data using the second filter to generate second data. The second memory portion has a function of storing the first data, the second data, and a plurality of filters for performing convolutional processing in and after a second layer of the first neural network and convolutional processing in and after a fourth layer of the second neural network. The arithmetic circuit has a function of performing processing in and after the second layer of the first neural network using the first data to output third data from an output layer of the first neural network, a function of performing pooling processing on the second data as processing in a second layer of the second neural network to generate fourth data, a function of combining the third data and the fourth data as processing in a third layer of the second neural network to generate fifth data, and a function of performing processing in and after the fourth layer of the second neural network using the fifth data to output a depth map of the image data from an output layer of the second neural network.

(4)

One embodiment of the present invention having the above structure (3) may further include a memory device. In particular, the memory device preferably has a function of storing the first filter, the second filter, and the plurality of filters; a function of transmitting the first filter and the second filter to the first memory portion; and a function of transmitting the plurality of filters to the second memory portion.

Note that in this specification and the like, a semiconductor device refers to a device that utilizes semiconductor characteristics, and means a circuit including a semiconductor element (a transistor, a diode, a photodiode, or the like), a device including the circuit, and the like. The semiconductor device also means all devices that can function by utilizing semiconductor characteristics. For example, an integrated circuit, a chip including an integrated circuit, and an electronic component including a chip in a package are examples of the semiconductor device. Moreover, a memory device, a display device, a light-emitting device, a lighting device, an electronic device, and the like themselves are semiconductor devices, or include semiconductor devices in some cases.

In the case where there is a description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relationship, for example, a connection relationship shown in drawings or texts, a connection relationship other than one shown in drawings or texts is regarded as being disclosed in the drawings or the texts. Each of X and Y denotes an object (e.g., a device, an element, a circuit, a wiring, an electrode, a terminal, a conductive film, or a layer).

For example, in the case where X and Y are electrically connected, one or more elements that allow(s) electrical connection between X and Y (e.g., a switch, a transistor, a capacitor, an inductor, a resistor, a diode, a display device, a light-emitting device, and a load) can be connected between X and Y. Note that a switch has a function of being controlled to be turned on or off. That is, the switch has a function of being in a conduction state (on state) or a non-conduction state (off state) to control whether a current flows or not.

For example, in the case where X and Y are functionally connected, one or more circuits that allow(s) functional connection between X and Y (e.g., a logic circuit (an inverter, a NAND circuit, a NOR circuit, or the like); a signal converter circuit (a digital-analog converter circuit, an analog-digital converter circuit, a gamma correction circuit, or the like); a potential level converter circuit (a power supply circuit (a step-up circuit, a step-down circuit, or the like), a level shifter circuit for changing the potential level of a signal, or the like); a voltage source; a current source; a switching circuit; an amplifier circuit (a circuit that can increase signal amplitude, the amount of current, or the like, an operational amplifier, a differential amplifier circuit, a source follower circuit, a buffer circuit, or the like); a signal generation circuit; a memory circuit; or a control circuit) can be connected between X and Y. For example, even when another circuit is interposed between X and Y, X and Y are regarded as being functionally connected when a signal output from X is transmitted to Y.

Note that an explicit description, X and Y are electrically connected, includes the case where X and Y are electrically connected (i.e., the case where X and Y are connected with another element or another circuit interposed therebetween) and the case where X and Y are directly connected (i.e., the case where X and Y are connected without another element or another circuit interposed therebetween).

It can be expressed as, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order". Alternatively, it can be expressed as "a source (or a first terminal or the like) of a transistor is electrically connected to X; a drain (or a second terminal or the like) of the transistor is electrically connected to Y; and X, the source (or the first terminal or the like) of the transistor, the drain (or the second terminal or the like) of the transistor, and Y are electrically connected to each other in this order". Alternatively, it can be expressed as "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order". When the connection order in a circuit structure is defined by an expression similar to the above examples, a source (or a first terminal or the like) and a drain (or a second terminal or the like) of a transistor can be distinguished from each other to specify the technical scope. Note that these expressions are examples and the expression is not limited to these expressions. Here, X and Y each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both components: a function of the wiring and a function of the electrode. Thus, electrical connection in this specification includes, in its category, such a case where one conductive film has functions of a plurality of components.

In this specification and the like, a "resistor" can be, for example, a circuit element or a wiring having a resistance value higher than 0Ω. Therefore, in this specification and the like, a "resistor" sometimes includes a wiring having a resistance value, a transistor in which current flows between its source and drain, a diode, and a coil. Thus, the term "resistor" can be replaced with the terms "resistance", "load", "region having a resistance value", and the like; inversely, the terms "resistance", "load", and "region having a resistance value" can be replaced with the term "resistor" and the like. The resistance value can be, for example, preferably greater than or equal to 1Ω and less than or equal to 10Ω, further preferably greater than or equal to 5Ω and less than or equal to 5Ω, still further preferably greater than or equal to 10Ω and less than or equal to 1Ω. As another example, the resistance value may be greater than or equal to 1Ω and less than or equal to $1 \times 10^9$Ω.

In this specification and the like, a "capacitor" can be, for example, a circuit element having an electrostatic capacitance value higher than 0° F., a region of a wiring having an electrostatic capacitance value, parasitic capacitance, or gate capacitance of a transistor. Therefore, in this specification and the like, a "capacitor" sometimes includes not only a circuit element that has a pair of electrodes and a dielectric between the electrodes, but also parasitic capacitance generated between wirings, gate capacitance generated between a gate and one of a source and a drain of a transistor, and the like. The terms "capacitor", "parasitic capacitance", "gate capacitance", and the like can be replaced with the term "capacitance" and the like; inversely, the term "capacitance" can be replaced with the terms "capacitor", "parasitic capacitance", "gate capacitance", and the like. The term "pair of electrodes" of "capacitor" can be replaced with "pair of conductors", "pair of conductive regions", "pair of regions", and the like. Note that the electrostatic capacitance value can be greater than or equal to 0.05 fF and less than or equal to 10 pF, for example. Alternatively, the electrostatic capacitance value may be greater than or equal to 1 pF and less than or equal to 10 μF, for example.

In this specification and the like, a transistor includes three terminals called a gate, a source, and a drain. The gate functions as a control terminal for controlling the conduction state of the transistor. Two terminals functioning as the source and the drain are input/output terminals of the transistor. One of the two input/output terminals serves as the source and the other serves as the drain on the basis of the conductivity type (n-channel type or p-channel type) of the transistor and the levels of potentials applied to the three terminals of the transistor. Thus, the terms "source" and "drain" can be replaced with each other in this specification and the like. In this specification and the like, expressions "one of a source and a drain" (or a first electrode or a first terminal) and "the other of the source and the drain" (or a second electrode or a second terminal) are used in description of the connection relationship of a transistor. Depending on the transistor structure, a transistor may include a back gate in addition to the above three terminals. In that case, in this specification and the like, one of the gate and the back gate of the transistor may be referred to as a first gate and the other of the gate and the back gate of the transistor may be referred to as a second gate. Moreover, the terms "gate" and "back gate" can be replaced with each other in one transistor in some cases. In the case where a transistor includes three or more gates, the gates may be referred to as a first gate, a second gate, and a third gate, for example, in this specification and the like.

In this specification and the like, a node can be referred to as a terminal, a wiring, an electrode, a conductive layer, a conductor, an impurity region, or the like depending on the circuit structure, the device structure, or the like. Furthermore, a terminal, a wiring, or the like can be referred to as a node.

In this specification and the like, "voltage" and "potential" can be replaced with each other as appropriate. The "voltage" refers to a potential difference from a reference potential, and when the reference potential is a ground potential, for example, the "voltage" can be replaced with the "potential". Note that the ground potential does not necessarily mean 0 V. Moreover, potentials are relative values, and a potential supplied to a wiring, a potential applied to a circuit and the like, a potential output from a circuit and the like, for example, are changed with a change of the reference potential.

In this specification and the like, the term "high-level potential" or "low-level potential" does not mean a particular potential. For example, in the case where two wirings are both described as "functioning as a wiring for supplying a high-level potential", the levels of the high-level potentials supplied by the wirings are not necessarily equal to each other. Similarly, in the case where two wirings are both described as "functioning as a wiring for supplying a low-level potential", the levels of the low-level potentials supplied by the wirings are not necessarily equal to each other.

Note that "current" is a charge transfer (electrical conduction); for example, the description "electrical conduction of positively charged particles occurs" can be rephrased as "electrical conduction of negatively charged particles occurs in the opposite direction". Therefore, unless otherwise specified, "current" in this specification and the like refers to a charge transfer (electrical conduction) accompanied by carrier movement. Examples of a carrier here include an electron, a hole, an anion, a cation, and a complex ion, and the type of carrier differs between current flow systems (e.g., a semiconductor, a metal, an electrolyte solution, and a vacuum). The "direction of a current" in a wiring or the like refers to the direction in which a carrier with a positive charge moves, and the amount of current is expressed as a positive value. In other words, the direction in which a carrier with a negative charge moves is opposite to the direction of a current, and the amount of current is expressed as a negative value. Thus, in the case where the polarity of a current (or the direction of a current) is not specified in this specification and the like, the description "current flows from element A to element B" can be rephrased as "current flows from element B to element A", for example. The description "current is input to element A" can be rephrased as "current is output from element A", for example.

Ordinal numbers such as "first", "second", and "third" in this specification and the like are used to avoid confusion among components. Thus, the terms do not limit the number of components. In addition, the terms do not limit the order of components. In this specification and the like, for example, a "first" component in one embodiment can be referred to as a "second" component in other embodiments or the scope of claims. Furthermore, in this specification and the like, for example, a "first" component in one embodiment can be omitted in other embodiments or the scope of claims.

In this specification and the like, the terms for describing positioning, such as "over" or "above" and "under" or "below", are sometimes used for convenience to describe the positional relationship between components with reference to drawings. The positional relationship between components is changed as appropriate in accordance with a direction in which the components are described. Thus, the positional relationship is not limited to the terms described in the specification and the like, and can be described with another term as appropriate depending on the situation. For example, the expression "an insulator positioned over (on) a top surface of a conductor" can be replaced with the expression "an insulator positioned under (on) a bottom surface of a conductor" when the direction of a drawing showing these components is rotated by 180°.

Furthermore, the terms such as "over" or "above" and "under" or "below" do not necessarily mean that a component is placed directly over or directly under and in direct contact with another component. For example, the expression "electrode B over insulating layer A" does not necessarily mean that the electrode B is formed over and in direct contact with the insulating layer A, and does not exclude the case where another component is provided between the insulating layer A and the electrode B.

In this specification and the like, the terms "film", "layer", and the like can be interchanged with each other depending on the situation. For example, the term "conductive layer" can be changed into the term "conductive film" in some cases. Moreover, the term "insulating film" can be changed into the term "insulating layer" in some cases. Alternatively, the term "film", "layer", or the like is not used and can be interchanged with another term depending on the case or according to circumstances. For example, the term "conductive layer" or "conductive film" can be changed into the term "conductor" in some cases. Furthermore, for example, the term "insulating layer" or "insulating film" can be changed into the term "insulator" in some cases.

In this specification and the like, the term "electrode", "wiring", "terminal", or the like does not limit the function of a component. For example, an "electrode" is used as part of a "wiring" in some cases, and vice versa. Furthermore, the term "electrode" or "wiring" also includes the case where a plurality of "electrodes" or "wirings" are formed in an integrated manner, for example. For example, a "terminal" is used as part of a "wiring" or an "electrode" in some cases, and vice versa. Furthermore, the term "terminal" can also include the case where a plurality of "electrodes", "wirings", "terminals", or the like are formed in an integrated manner. Therefore, for example, an "electrode" can be part of a "wiring" or a "terminal", and a "terminal" can be part of a "wiring" or an "electrode". Moreover, the term "electrode", "wiring", "terminal", or the like is sometimes replaced with the term "region", for example.

In this specification and the like, the terms "wiring", "signal line", "power supply line", and the like can be interchanged with each other depending on the case or according to circumstances. For example, the term "wiring" can be changed into the term "signal line" in some cases. As another example, the term "wiring" can be changed into the term "power supply line" in some cases. Inversely, the term "signal line", "power supply line", or the like can be changed into the term "wiring" in some cases. The term "power supply line" or the like can be changed into the term "signal line" or the like in some cases. Inversely, the term "signal line" or the like can be changed into the term "power supply line" or the like in some cases. The term "potential" that is applied to a wiring can be changed into the term "signal" or the like depending on the case or according to circumstances. Inversely, the term "signal" or the like can be changed into the term "potential" in some cases.

In this specification and the like, an impurity in a semiconductor refers to an element other than a main component of a semiconductor layer, for example. For example, an element with a concentration of lower than 0.1 atomic % is an impurity. When an impurity is contained, for example, the density of defect states might be formed in a semiconductor, the carrier mobility might be decreased, or the crystallinity might be decreased. In the case where the semiconductor is an oxide semiconductor, examples of an impurity that changes characteristics of the semiconductor include Group 1 elements, Group 2 elements, Group 13 elements, Group 14 elements, Group 15 elements, and transition metals other than the main components; specific examples are hydrogen (including water), lithium, sodium, silicon, boron, phosphorus, carbon, and nitrogen. Specifically, when the semiconductor is a silicon layer, examples of an impurity that changes characteristics of the semiconductor include Group 1 elements, Group 2 elements, Group 13 elements, and Group 15 elements (except oxygen and hydrogen).

In this specification and the like, a switch has a function of being in a conduction state (on state) or a non-conduction state (off state) to determine whether a current flows or not. Alternatively, a switch has a function of selecting and changing a current path. For example, an electrical switch or a mechanical switch can be used. That is, a switch can be any element capable of controlling a current, and is not limited to a particular element.

Examples of an electrical switch include a transistor (e.g., a bipolar transistor and a MOS transistor), a diode (e.g., a PN diode, a PIN diode, a Schottky diode, a MIM (Metal Insulator Metal) diode, a MIS (Metal Insulator Semiconductor) diode, and a diode-connected transistor), and a logic circuit in which such elements are combined. Note that in the case of using a transistor as a switch, a "conduction state" of the transistor refers to a state where a source electrode and a drain electrode of the transistor can be regarded as being electrically short-circuited. Furthermore, a "non-conduction state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch formed using a MEMS (micro electro mechanical system) technology. Such a switch includes an electrode that can be moved mechanically, and operates by controlling conduction and non-conduction with movement of the electrode.

In this specification, "parallel" indicates a state where two straight lines are placed at an angle greater than or equal to −10° and less than or equal to 10°. Thus, the case where the angle is greater than or equal to −5° and less than or equal to 5° is also included. In addition, the term "approximately parallel" or "substantially parallel" indicates a state where two straight lines are placed at an angle greater than or equal to −30° and less than or equal to 30°. Moreover, "perpendicular" indicates a state where two straight lines are placed at an angle greater than or equal to 80° and less than or equal to 100°. Thus, the case where the angle is greater than or equal to 85° and less than or equal to 95° is also included. Furthermore, "approximately perpendicular" or "substantially perpendicular" indicates a state where two straight lines are placed at an angle greater than or equal to 60° and less than or equal to 120°.

Effect of the Invention

According to one embodiment of the present invention, a system capable of product-sum operation can be provided. According to another embodiment of the present invention, a system with low power consumption can be provided. According to another embodiment of the present invention, a system with high processing speed can be provided.

According to another embodiment of the present invention, a novel system can be provided. According to another embodiment of the present invention, a novel operation method of a system can be provided.

Note that the effects of embodiments of the present invention are not limited to the effects listed above. The effects listed above do not preclude the existence of other effects. The other effects are effects that are not described in this section and will be described below. The effects that are not described in this section are derived from the descriptions of the specification, the drawings, and the like and can be extracted from these descriptions by those skilled in the art. Note that one embodiment of the present invention has at least one of the effects listed above and the other effects. Accordingly, depending on the case, one embodiment of the present invention does not have the effects listed above in some cases.

MODE FOR CARRYING OUT THE INVENTION

Figure 1:
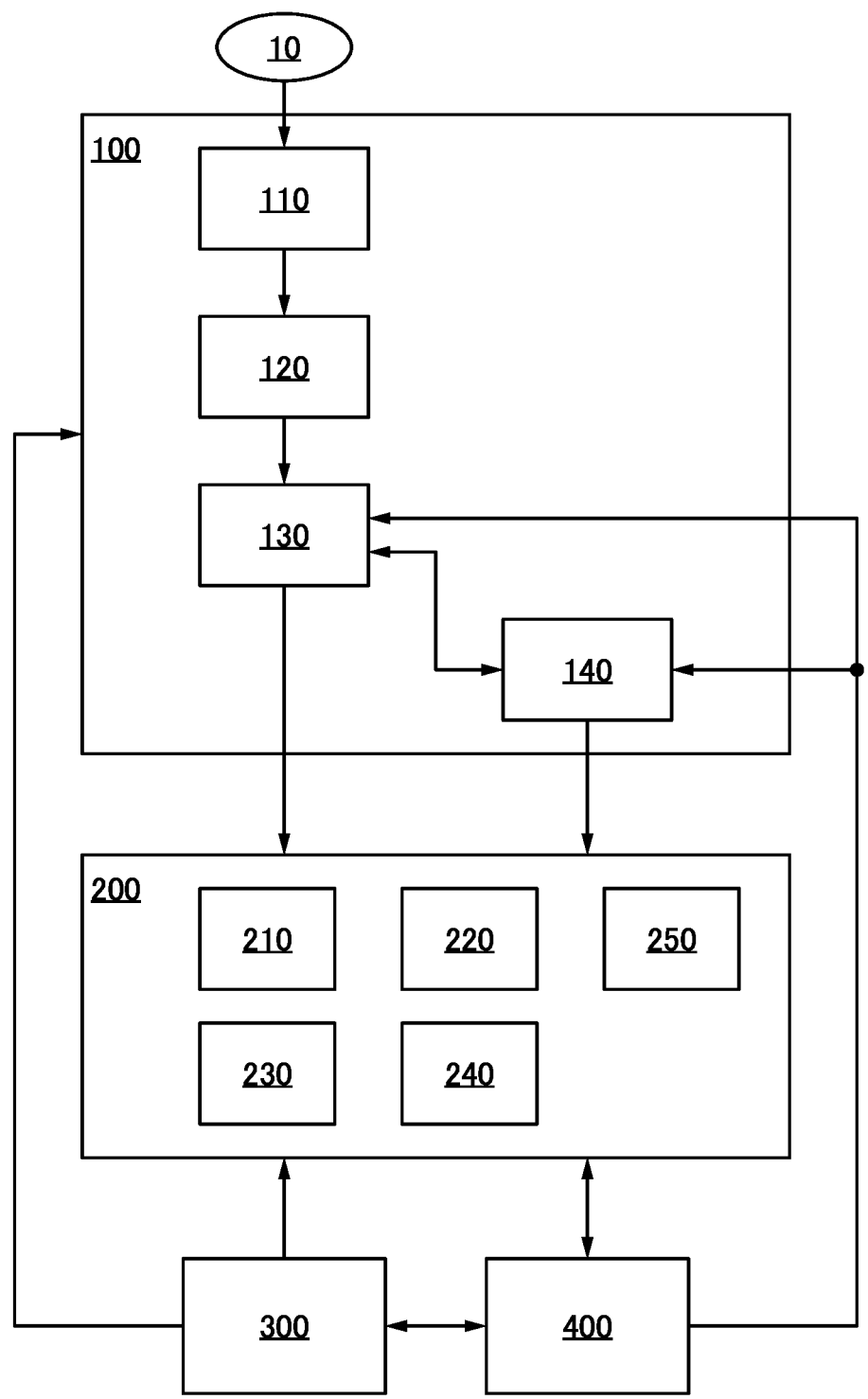
FIG. 1 is a block diagram illustrating a structure example of a system.

In an artificial neural network (hereinafter, referred to as a neural network), the connection strength between synapses can be changed by providing the neural network with existing information. The processing for determining a connection strength by providing a neural network with existing information in such a manner is called "learning" in some cases.

Furthermore, when a neural network in which "learning" has been performed (the connection strength has been determined) is provided with some type of information, new information can be output on the basis of the connection strength. The processing for outputting new information on the basis of provided information and the connection strength in a neural network in such a manner is called "inference" or "recognition" in some cases.

Examples of the model of a neural network include a Hopfield neural network and a hierarchical neural network. In particular, a neural network with a multilayer structure is called a "deep neural network" (DNN), and machine learning using a deep neural network is called "deep learning" in some cases.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is included in a channel formation region of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an OS transistor is mentioned, the OS transistor can also be referred to as a transistor including a metal oxide or an oxide semiconductor.

Furthermore, in this specification and the like, a metal oxide containing nitrogen is also collectively referred to as a metal oxide in some cases. A metal oxide containing nitrogen may be referred to as a metal oxynitride.

In this specification and the like, one embodiment of the present invention can be constituted by appropriately combining a structure described in an embodiment with any of the structures described in the other embodiments. In addition, in the case where a plurality of structure examples is described in one embodiment, the structure examples can be combined as appropriate.

Note that a content (or part of the content) described in one embodiment can be applied to, combined with, or replaced with at least one of another content (or part of the content) in the embodiment and a content (or part of the content) described in one or a plurality of different embodiments.

Note that in each embodiment (or the example), a content described in the embodiment is a content described with reference to a variety of diagrams or a content described with text disclosed in the specification.

Note that by combining a diagram (or part thereof) described in one embodiment with at least one of another part of the diagram, a different diagram (or part thereof) described in the embodiment, and a diagram (or part thereof) described in one or a plurality of different embodiments, much more diagrams can be formed.

Embodiments described in this specification are described with reference to the drawings. Note that the embodiments can be implemented in many different modes, and it will be readily appreciated by those skilled in the art that modes and details can be changed in various ways without departing from the spirit and scope thereof. Therefore, the present invention should not be interpreted as being limited to the description in the embodiments. Note that in the structures of the invention in the embodiments, the same portions or portions having similar functions are denoted by the same reference numerals in different drawings, and repeated description thereof is omitted in some cases. In perspective views and the like, some components might not be illustrated for clarity of the drawings.

In this specification and the like, when a plurality of components are denoted with the same reference numerals, and in particular need to be distinguished from each other, an identification sign such as "_1", "[n]", or "[m,n]" is sometimes added to the reference numerals.

In the drawings in this specification, the size, the layer thickness, or the region is exaggerated for clarity in some cases. Therefore, they are not limited to the illustrated scale. The drawings are schematic views showing ideal examples, and embodiments of the present invention are not limited to shapes or values shown in the drawings. For example, variations in signal, voltage, or current due to noise, variations in signal, voltage, or current due to difference in timing, or the like can be included.

Embodiment 1

In this embodiment, a system of one embodiment of the present invention and an operation method thereof are described.

The system of one embodiment of the present invention is a system that estimates a depth in each pixel of an input image using a neural network, and generates a depth map corresponding to the image. In addition, the system of one embodiment of the present invention can generate a three-dimensional image by adding the depth to each pixel of the image. Note that in this specification and the like, the system of one embodiment of the present invention is referred to as an AI system in some cases.

The neural network can be a hierarchical neural network including a total of Z layers (Z is an integer of 3 or more), for example. A first layer of the neural network performs convolutional processing on image data. Note that the convolutional processing will be described in detail in Embodiment 2.

Structure Example

First, a structure example of an AI system of one embodiment of the present invention is described.

FIG. 1 is a block diagram illustrating an example of the AI system. The AI system includes an imaging device 100, an arithmetic circuit 200, a control circuit 300, and a memory device 400, for example.

The imaging device 100 includes an imaging portion 110, a processing portion 120, a memory portion 130, and an arithmetic portion 140, for example.

The arithmetic circuit 200 includes a multiplication unit 210, an addition unit 220, an activation function circuit 230, a pooling processing portion 240, and a memory portion 250, for example.

In the imaging device 100, the imaging portion 110 is electrically connected to the processing portion 120. The processing portion 120 is electrically connected to the memory portion 130. The memory portion 130 is electrically connected to the arithmetic portion 140.

The imaging device 100 is electrically connected to the arithmetic circuit 200. In particular, the memory portion 130 is electrically connected to the arithmetic circuit 200 in FIG. 1. Note that in the imaging device 100, the arithmetic portion 140 may be electrically connected to the arithmetic circuit 200.

The control circuit 300 is electrically connected to the imaging device 100, the arithmetic circuit 200, and the memory device 400. The memory device 400 is electrically connected to the imaging device 100 and the arithmetic circuit 200.

The imaging portion 110 has a function of obtaining light 10 reflected by an external subject to generate image data. Specifically, for example, in the imaging portion 110, the obtained light 10 is converted into an electric signal (e.g., a current or a voltage), and the electric signal is determined in accordance with the image data. Note that the imaging portion 110 can be a circuit including a CCD (Charge Coupled Device) image sensor with a color filter, a monochrome CCD image sensor, or the like.

The processing portion 120 has a function of processing an electric signal generated by the imaging portion 110. The processing portion 120 includes, for example, an amplifier for amplifying the electric signal, a correlated double sampling circuit for reducing noise, or the like.

The memory portion 130 has a function of obtaining the electric signal processed by the processing portion 120 and storing image data based on the electric signal. The memory portion 130 has a function of storing not only the image data but also a parameter (e.g., a filter size, a filter value included in a filter, or a stride) to be input to the arithmetic portion 140 and the result of the operation performed in the arithmetic portion 140. Furthermore, the memory portion 130 has a function of reading stored information and transmitting the information to a desired circuit.

For the memory portion 130, a volatile memory such as an SRAM (Static Random Access Memory) or a DRAM (Dynamic Random Access Memory) can be used, for example.

Alternatively, a nonvolatile memory such as a ReRAM (Resistive Random Access Memory), an MRAM (Magnetoresistive Random Access Memory), or a phase-change memory may be used for the memory portion 130.

The arithmetic portion 140 has a function of performing multiplication using multiplier data and multiplicand data, and a function of performing addition on a plurality of multiplication results. That is, the arithmetic portion 140 has a function of performing product-sum operation. Thus, the arithmetic portion 140 may include a multiplication unit, an addition unit, or the like.

The multiplier data can be one of a given parameter (e.g., a filter value included in a filter) and image data, for example, and the multiplicand data can be the other of the given parameter (e.g., the filter value included in the filter) and the image data, for example.

In addition, the arithmetic portion 140 may include a function circuit similar to the activation function circuit 230 described later. The function circuit included in the arithmetic portion 140 has a function of, for example, outputting a function value obtained using the product-sum operation result as an input value. Note that the function calculated in the function circuit can be, for example, a ReLU (Rectified Linear Unit) function, a sigmoid function, or a tanh function. In particular, examples of kinds of the ReLU function include a Softplus function, a Leaky ReLU function, a Parametarized ReLU function, and an ELU (Exponetial Linear Unit) function. Depending on the case, the function calculated in the function circuit may be a Softmax function, an identify function, or the like.

The arithmetic circuit 200 has a function of performing product-sum operation like the arithmetic portion 140, using the multiplication unit 210 and the addition unit 220. In addition, the arithmetic circuit 200 has a function of outputting a function value obtained using the product-sum operation result as an input value, using the activation function circuit 230. Note that the function calculated in the activation function circuit 230 can be, for example, a ReLU function, a sigmoid function, or a tanh function, as in the above-described function circuit included in the arithmetic portion 140. Depending on the case, the function calculated in the function circuit may be a Softmax function, an identify function, or the like.

The pooling processing portion 240 included in the arithmetic circuit 200 has a function of, for example, performing pooling processing on image data that is output after being calculated in the arithmetic circuit 200. The pooling processing can be max pooling, average pooling, or Lp pooling, for example. The pooling processing will be described in detail in Embodiment 2.

The memory portion 250 included in the arithmetic circuit 200 has a function of, for example, storing image data transmitted from the imaging device 100, data calculated by the arithmetic portion 140, a given parameter (e.g., a filter value included in a filter value) to be input to the multiplication unit 210, the result of product-sum operation by the multiplication unit 210 and the addition unit 220, the result of pooling processing, the output function result of the activation function circuit 230, or the like.

The control circuit 300 has a function of controlling the imaging device 100, the arithmetic circuit 200, and the memory device 400. Specifically, for example, the control circuit 300 generates an electric signal in accordance with instruction information, and transmits the electric signal to the imaging device 100, the arithmetic circuit 200, or the memory device 400. The imaging device 100, the arithmetic circuit 200, and the memory device 400 receive the electric signal and operate in accordance with the instruction information. In this manner, the control circuit 300 can control the imaging device 100, the arithmetic circuit 200, and the memory device 400.

The memory device 400 has a function of, for example, storing data calculated by the arithmetic circuit 200, a parameter (e.g., a filter size, a filter value included in a filter, or a stride) used for convolutional processing and to be input to the imaging device 100 or the arithmetic circuit 200, or the like.

Operation Example

Figure 2:
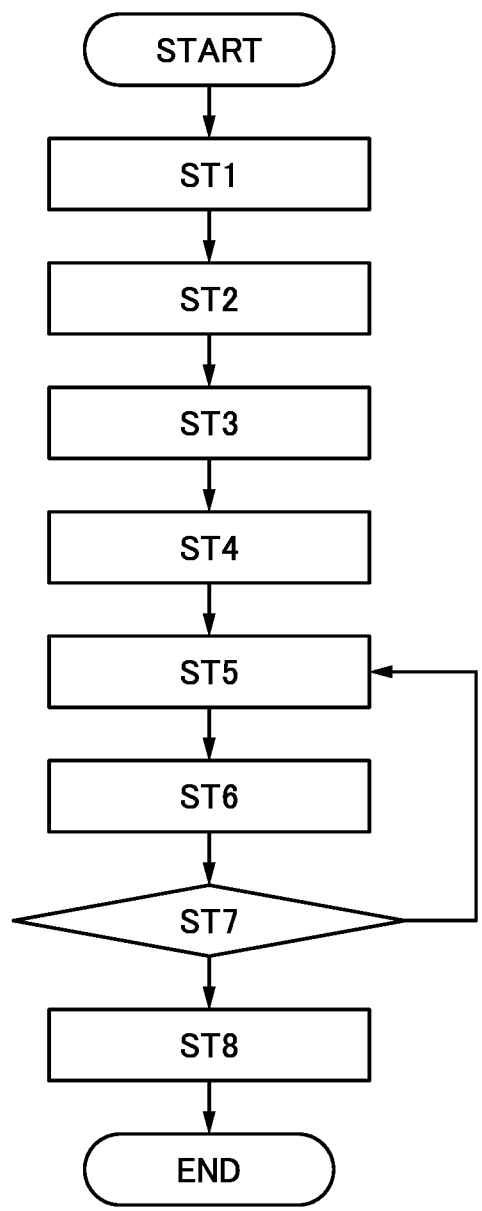
FIG. 2 is a flow chart illustrating an operation example of a system.

Next, an operation method of the AI system in FIG. 1 is described. A flow chart shown in FIG. 2 shows an example of the operation method of the AI system in FIG. 1. Note that the operation method in the flow chart in FIG. 2 includes Step ST1 to Step ST8.

The flow chart in FIG. 2 shows an operation method where convolutional processing in the first layer of the neural network of the AI system is performed by the imaging portion 110, and calculation in the second layer to the Z-th layer of the neural network is performed by the arithmetic circuit 200. In FIG. 2, start of the operation method of the AI system is denoted by "START" and end of the operation method of the AI system is denoted by "END".

<<Step ST1>>

Step ST1 includes a step where the imaging portion 110 obtains the light 10 reflected by an external subject to generate image data. Specifically, in Step ST1, the obtained light 10 is converted into an electric signal (e.g., a current or a voltage) as image data, for example.

In addition, in Step ST1, the processing portion 120 may perform various types of processing on the converted electric signal. Specifically, in Step ST1, the electric signal may be amplified, for example. Alternatively, in Step ST1, correlated double sampling processing may be performed on the electric signal to reduce noise included in the electric signal, for example.

<<Step ST2>>

Step ST2 includes a step of writing the image data (the electric signal) generated in Step ST1 to the memory portion 130.

<Step ST3>>

Step ST3 includes a step of reading a filter for the first layer of the neural network of the AI system from the memory device 400, and inputting the filter to the imaging device 100. Specifically, the filter is input to the arithmetic portion 140 of the imaging device 100, for example. Note that the filter may be written to the memory portion 130 of the imaging device 100 in advance, and the filter may be read from the memory portion 130 and input to the arithmetic portion 140 later.

<<Step ST4>>

In Step ST4, convolutional processing is performed in the first layer of the neural network of the AI system.

Step ST4 includes a step of performing convolutional processing on the image data generated in Step ST1 using the filter for the first layer read in Step ST3. Specifically, Step ST4 includes a step of reading a partial region of the image data from the memory portion 130 and inputting the partial region of the image data to the arithmetic portion 140, and a step of reading the filter for the first layer from the memory portion 130 and inputting the filter to the arithmetic portion 140. At this time, the arithmetic portion 140 performs a step of convolutional processing using the input filter as the multiplier data and the partial region of the image data as the multiplicand data. Alternatively, the convolutional processing may be performed using the filter input to the arithmetic portion 140 in Step ST3 as the multiplicand data and the partial region of the image data as the multiplier data. A value obtained by the convolutional processing is written to the memory portion 130 or the memory portion 250 of the arithmetic circuit 200.

Note that in Step ST4, after the convolutional processing using the filter and the partial region of the image data read from the memory portion 130 is completed, convolutional processing using the filter and a different partial region of the image data is performed. In this manner, partial regions are sequentially selected from the image data obtained in the imaging portion 110 and convolutional processing using the filter is performed in each selected region, whereby calculation values of the convolutional processing in the regions can be obtained.

When the calculation values obtained in the regions are arranged in a matrix, the calculation values arranged in a matrix correspond to image data obtained by the convolutional processing using the image data obtained in the imaging portion 110 and the filter. That is, in Step ST4, image data (hereinafter referred to as first feature-extracted image data) obtained by extracting only characteristic portions from the image data obtained in the imaging portion 110 is generated. As described above, the first feature-extracted image data may be written to the memory portion 130 or may be written to the memory portion 250 of the arithmetic circuit 200.

In the case where a function circuit is included in the arithmetic portion 140, calculation values obtained in the regions of the image data may be input to the function circuit to calculate function values, as part of the convolutional processing. In that case, for example, the function values are arranged in a matrix instead of the calculation values obtained in the regions, whereby the function values arranged in a matrix can be handled as the first feature-extracted image data instead of the calculation values arranged in a matrix.

Step ST4 may further include a step of performing pooling processing on the first feature-extracted image data using the pooling processing portion 240. In this case, the pooling processing may be regarded as processing in the second layer of the neural network of the AI system.

Note that a plurality of regions in the image data may be set by a user such that the regions do not overlap with each other. Alternatively, the plurality of regions of the image data may be set by a user such that the regions partly overlap with each other. That is, in the convolutional processing, parameters such as a filter size, a filter value, and a stride can be determined according to circumstances.

<<Step ST5>>

Step ST5 includes a step where the arithmetic circuit 200 receives instruction information transmitted from the control circuit 300 or the like. The instruction information includes information on processing in the x-th layer (here, x is an integer of greater than or equal to 2 and less than or equal to Z) of the neural network of the AI system. For example, in the case where Step ST5 is performed for the first time and calculation up to the first layer has been finished in the neural network of the AI system in Step ST4, x=2 can be satisfied. Alternatively, for example, in the case where Step ST5 is performed for the first time and calculation up to the second layer has been finished in the neural network of the AI system in Step ST4, x=3 can be satisfied.

Note that the processing in the x-th layer included in the instruction information can be, for example, convolutional processing similar to that in Step ST4, pooling processing, or arithmetic processing in a fully connected layer. Note that the arithmetic processing in the fully connected layer will be described in Embodiment 2.

In particular, in the case of performing convolutional processing, Step ST5 preferably includes a step of reading a filter to be used in the convolutional processing from the memory device 400 and writing the filter to the memory portion 250 of the arithmetic circuit 200.

Furthermore, in Step ST5, processing for combining image data output from another neural network and image data output in processing in the (x−1)-th layer may be performed to generate new feature-extracted image data.

<<Step ST6>>

In Step ST6, processing is performed in the x-th layer of the neural network of the AI system.

Step ST6 includes a step of performing processing included in the instruction information transmitted to the arithmetic circuit 200 in Step ST5, on the image data that is output after being processed in the (x−1)-th layer. For example, when x=2, that is, when processing in the second layer is performed, the first feature-extracted image data generated in Step ST4 is read from the memory portion 130 or the memory portion 250, and any one of convolutional processing, pooling processing, and the like is performed on the feature-extracted image data by the circuits included in the arithmetic circuit 200.

In particular, in the case of performing convolutional processing in Step ST6, the convolutional processing is performed using the filter used for the convolutional processing read from the memory portion 250 as the multiplier data and the first feature-extracted image data read from the memory portion 130 or the memory portion 250 as the multiplicand data.

By the processing in the second layer, image data (second feature-extracted image data) obtained by performing further feature extraction on the first feature-extracted image data can be output.

In Step ST6, when x is 3 or more, for example, processing in the x-th layer (any one of convolutional processing by the multiplication unit 210, the addition unit 220, or the like and pooling processing by the pooling processing portion 240) is performed on the image data that is output after being processed in the (x−1)-th layer. Thus, the x-th layer can output an image obtained by performing further feature extraction on the image output from the (x−1)-th layer.

As described above, through the processing in the x-th layer of the neural network of the AI system performed in Step ST6, image data generated in the (x−1)-th layer of the neural network of the AI system can be converted into image data obtained by further feature extraction.

<<Step ST7>>

In Step ST7, whether calculation of the hierarchical neural network has been performed up to the (Z−1)-th layer is determined. In the case where the calculation of the hierarchical neural network has been performed up to the (Z−1)-th layer, the operation proceeds to Step ST8, and in the case where the calculation of the hierarchical neural network has not been performed up to the (Z−1)-th layer, the operation returns to Step ST5 and calculation of the next intermediate layer is performed. In this case, when Step ST5 performed last is processing in the x-th layer of the neural network of the AI system, Step ST5 to be performed next can be regarded as processing in the (x+1)-th layer of the neural network of the AI system.

<<Step ST8>>

Step ST8 includes a step of performing calculation in the Z-th layer (sometimes referred to as an output layer) of the neural network of the AI system. The processing in the Z-th layer of the neural network of the AI system can be, for example, convolutional processing, pooling processing, or arithmetic processing in the fully connected layer.

Through the processing in the Z-th layer of the neural network of the AI system performed in Step ST8, image data generated in the (Z−1)-th layer of the neural network of the AI system can be converted into image data (hereafter referred to as the last feature-extracted image data) obtained by further feature extraction.

The last feature-extracted image data can be stored in the memory device 400, for example. In this case, by reading the last feature-extracted image data from the memory device 400 when software such as image analyzing software or image editing software is used, the last feature-extracted image data can be handled in the software.

In addition, the last feature-extracted image data can be used in next arithmetic operation in another neural network. This can be applied to, for example, a Coarse/Refined model in <Depth estimation> to be described later.

By performing the operation example shown in the flow chart in FIG. 2 using the AI system in FIG. 1, calculation (convolutional processing) in the first layer of the hierarchical neural network can be performed by the imaging device 100, and calculation in and after the second layer can be performed by the arithmetic circuit 200. Thus, the arithmetic circuit 200 need not perform the calculation in the first layer of the hierarchical neural network, and accordingly the processing speed of the arithmetic circuit 200 can be increased in some cases. Furthermore, the power consumption of the arithmetic circuit 200 can be reduced.

Note that the operation method of the structure example described in this embodiment is not limited to Step ST1 to Step ST8 shown in FIG. 2. In this specification and the like, processing shown in the flow charts is classified according to functions and shown as independent steps. However, in actual processing or the like, it is difficult to separate processing shown in the flow charts on the function basis, and there are such a case where a plurality of steps are associated with one step and a case where one step is associated with a plurality of steps. Thus, the processing shown in the flow charts is not limited to each step described in the specification, and the steps can be exchanged as appropriate according to circumstances. Specifically, in some cases, the order of steps can be changed, a step can be added or omitted, for example, according to circumstances.

<Depth Estimation>

Here, an example of a method for performing depth estimation on input image data using the AI system in FIG. 1 is described.

Figure 3:
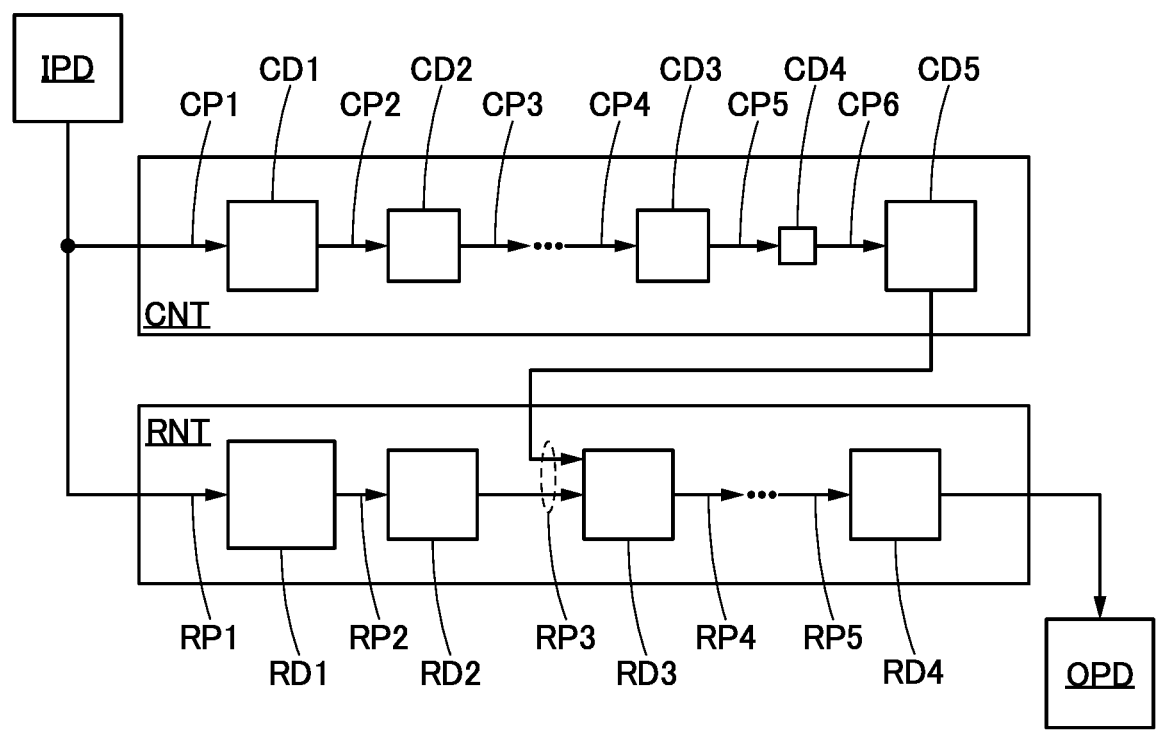
FIG. 3 is a block diagram illustrating an example of a neural network whose arithmetic operation can be performed by a system.

FIG. 3 illustrates the Coarse/Refined model, which is an example of a hierarchical neural network. The Coarse/Refined model is a model formed of two neural networks of a Global Coarse-Scale Network and a Local Fine-Scale Network, and is used for depth estimation of an image, for example. Specifically, in the network, a feature map is generated from input image data by the Global Coarse-Scale Network, and a depth map is generated on the basis of the input image data and the feature map by the Local Fine-Scale Network.

In FIG. 3, a network CNT is an example of the Global Coarse-Scale Network and a network RNT is an example of the Local Fine-Scale Network.

First, the network CNT is described.

The network CNT is a neural network that performs processing CP1 to processing CP6 on an input image to extract global features from the input image, for example. When an input image is input to an input layer of the network CNT, the network CNT can output image data (hereinafter referred to as a feature map) including global features of the input image from an output layer of the network CNT.

FIG. 3 illustrates image data IPD as the input image. The image data IPD can be, for example, image data generated in the imaging portion 110 of the AI system in FIG. 1, or image data processed in the processing portion 120.

When the image data IPD is input to the network CNT, the network CNT performs the processing CP1 on the image data IPD. The processing CP1 corresponds to processing in a first layer of the network CNT, and can be convolutional processing, for example. FIG. 3 illustrates a situation where the processing CP1 is performed on the image data IPD to output image data CD1. Note that parameters such as a filter size, a filter value, and a stride in the convolutional processing may be freely determined.

Although image data for channels corresponding to the number of filters is output in the convolutional processing, all the channels are collectively referred to as image data in this embodiment. For example, when 96 filters are used in the convolutional processing of the processing CP1, the image data CD1 for 96 channels is generated in the processing CP1.

Note that the processing CP1 can be processing performed in the arithmetic portion 140 of the AI system in FIG. 1. That is, the processing CP1 corresponds to the operation performed in Step ST4 in the above-described operation example.

Next, the processing CP2 is performed on the image data CD1. The processing CP2 corresponds to processing in a second layer of the network CNT and can be pooling processing, for example. FIG. 3 illustrates a situation where the processing CP2 is performed on the image data CD1 to output image data CD2.

In addition, the processing CP3 is performed on the image data CD2. The processing CP3 corresponds to processing in a third layer of the network CNT and can be convolutional processing, for example. Further convolutional processing is performed on image data output by the processing CP3 to generate new image data. Thus, convolutional processing is performed a plurality of times after the processing CP3. FIG. 3 illustrates a situation where processing up to the processing CP4 has been performed as convolutional processing and image data CD3 is output. Note that parameters such as a filter size, a filter value, and a stride in the convolutional processing between the processing CP3 and the processing CP4 may be freely determined. In addition, another processing such as pooling processing can be included between the processing CP3 and the processing CP4 instead of the convolutional processing. From the processing CP3 to the processing CP4, the number of channels of the output image data may increase each time processing is performed.

Next, the processing CP5 is performed on the image data CD3. The processing CP5 can be, for example, arithmetic processing in a fully connected layer. FIG. 3 illustrates a situation where the processing CP5 is performed on the image data CD3 to output image data CD4. Note that the number of channels of the image data CD4 may be increased from the number of channels of the image data CD3.

Note that the processing CP3 to the processing CP5 can be, for example, processing performed in the arithmetic circuit 200 of the AI system in FIG. 1. That is, the processing CP3 to the processing CP5 correspond to the operation performed in Step ST5 to Step ST7 in the above-described operation example.

As the last processing in the network CNT, the processing CP6 is performed on the image data CD4. The processing CP6 can be, for example, processing in the fully connected layer. Here, image data CD5 for one channel can be output by the processing CP6, for example. FIG. 3 illustrates a situation where the processing CP6 is performed on the image data CD4 to output the image data CD5.

The image data CD5 corresponds to the feature map of the image data IPD which is obtained by inputting the image data IPD to the network CNT. Note that the feature map is preferably stored in the memory device 400. By storing the feature map in the memory device 400, arithmetic operation can be performed using the feature map in the network RNT described below.

Note that the processing CP6 can be processing performed in the arithmetic circuit 200 of the AI system in FIG. 1, and corresponds to the operation performed in Step ST8 in the above-described operation example.

Next, the network RNT is described.

The network RNT is a neural network that performs processing from processing RP1 to processing RP5 using an input image and a feature map of the input image to estimate a depth of the input image. When the input image and the feature map of the input image are input to the network RNT, the network RNT can output an image (hereinafter referred to as a depth map) including information on the depth of the input image from an output layer of the network RNT.

When the image data IPD is input to the network RNT, the network RNT performs the processing RP1 on the image data IPD. The processing RP1 corresponds to processing in a first layer of the network RNT and can be convolutional processing, for example. FIG. 3 illustrates a situation where the processing RP1 is performed on the image data IPD to output image data RD1. Note that parameters such as a filter size, a filter value, and a stride in the convolutional processing may be freely determined by a user. Here, the image data RD1 including image data for a plurality of channels is output by the processing RP1, for example.

Note that the processing RP1 can be processing performed in the arithmetic portion 140 of the AI system in FIG. 1. That is, the processing RP1 corresponds to the operation performed in Step ST4 in the above-described operation example.

Next, the processing RP2 is performed on the image data RD1. The processing RP2 corresponds to processing in a second layer of the network RNT and can be pooling processing, for example. FIG. 3 illustrates a situation where the processing RP2 is performed on the image data RD1 to output image data RD2.

In the processing RP3, processing for combining the image data RD2 and the image data CD5 (the feature map) generated by the network CNT is performed. Specifically, the channel of the image data CD5 generated by the processing CP6 and the channels of the image data RD2 generated by the processing RP2 are combined to be output as image data RD3. For example, in the case where the image data CD5 includes image data for one channel and the image data RD2 includes image data for 63 channels, the image data RD3 is generated as image data for 64 channels by the processing CP6. Therefore, in order to perform the processing RP3, the image data size of one channel of the image data CD5 needs to be equal to the image data size of each channel of the image data RD2. Note that the processing RP3 corresponds to processing in a third layer of the network RNT. FIG. 3 illustrates a situation where the image data RD3 obtained by combining the image data RD2 and the image data CD5 is output.

At this time, for example, the image data CD5 that is the feature map output from the network CNT in advance is read from the memory device 400 and input to the arithmetic circuit 200, for example. Then, the image data RD2 generated by the processing RP2 and the image data CD5 (the feature map) generated by the network CNT are combined by the processing RP3 to be output as the image data RD3.

The processing RP4 is performed on the image data RD3. The processing RP4 corresponds to processing in a fourth layer of the network RNT and can be convolutional processing, for example. Further convolutional processing may be performed on the image data output by the processing CP4 to generate new image data. Thus, convolutional processing is performed one or more times after the processing RP4. FIG. 3 illustrates a situation where the convolutional processing up to the processing RP5 has been performed and the image data RD4 is output. Here, for example, image data for a plurality of channels can be output by the processing after the processing RP4 (except for the processing RP5), and the image data RD4 for one channel can be output by the processing RP5. Note that parameters such as a filter size, a filter value, and a stride in the convolutional processing between the processing RP4 and the processing RP5 may be freely determined. In addition, another processing such as pooling processing can be included between the processing RP4 and the processing RP5 instead of the convolutional processing.

Note that the processing RP2 to the processing RP4 can be processing performed in the arithmetic circuit 200 of the AI system in FIG. 1. That is, the processing RP2 to the processing RP4 correspond to the operation performed in Step ST5 to Step ST7 in the above-described operation example. The processing RP5 corresponds to the operation performed in Step ST8 in the above-described operation example.

The image data RD4 output by the processing RP5 is output as image data OPD from the network RNT. The image data OPD corresponds to the depth map of the image data IPD which is obtained by inputting the image data IPD to the Coarse/Refined model.

As described above, calculation of the Coarse/Refined model used for depth estimation or the like can be performed using the AI system in FIG. 1.

Although calculation of the Coarse/Refined model is performed using the AI system in FIG. 1 in the above-described example, one embodiment of the present invention is not limited thereto. For example, the AI system in FIG. 1 may be used for calculation of an FCN (Fully-Convolutional Network), a U-NET, a GAN (Generative Adversarial Network), or the like.

The FCN or U-NET sometimes can be formed of one neural network, for example. That is, processing in the first layer of the neural network is performed by the imaging device 100 of the AI system in FIG. 1 and processing in and after the second layer of the neural network is performed by the arithmetic circuit 200, whereby a depth map corresponding to the input image can be obtained.

After the depth map corresponding to the input image data is generated using the AI system in FIG. 1, additional processing may be performed utilizing the depth map. For example, a three-dimensional image may be generated from the image data and the depth map using the arithmetic circuit 200 or the like.

Note that this embodiment can be combined with any of the other embodiments in this specification as appropriate.

Embodiment 2

This embodiment describes a convolutional neural network (hereinafter referred to as CNN) used for the AI system described in the above embodiment.

<Convolutional Neural Network>

Figure 4:
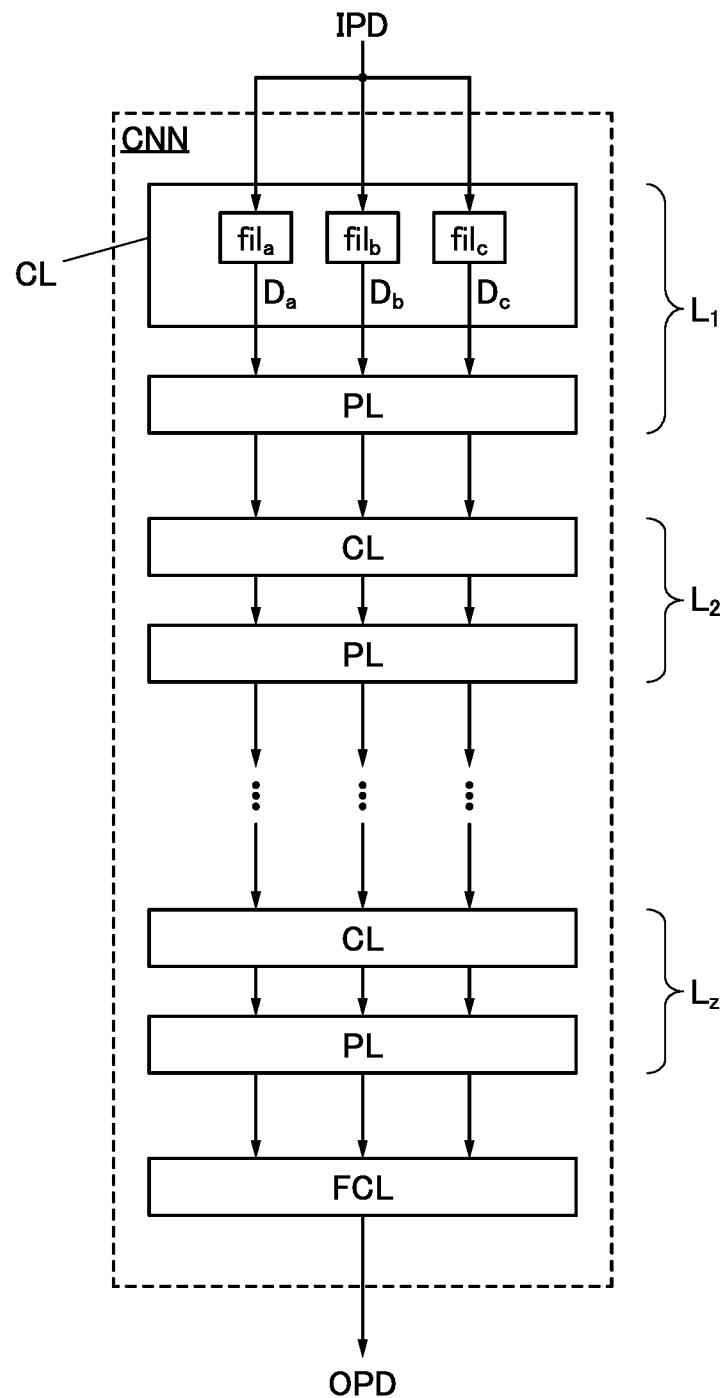
FIG. 4 is a block diagram illustrating a structure example of CNN.

CNN is one of calculation models used for feature extraction of an image or the like. FIG. 4 illustrates a structure example of the CNN. The CNN is formed of a convolutional layer CL, a pooling layer PL, and a fully connected layer FCL. The image data IPD captured by the imaging portion 110 is input to the CNN and subjected to feature extraction.

The convolutional layer CL has a function of performing convolutional processing on the image data. The convolutional processing is performed by repeating the product-sum operation using a partial region of the image data and the filter value of a weight filter. By the convolution in the convolutional layer CL, a feature of an image are extracted.

For the convolutional processing, one or a plurality of weight filters can be used. In the case of using a plurality of weight filters, a plurality of features of the image data can be extracted. FIG. 4 illustrates an example in which three filters (a filter $fil_a$, a filter $fil_b$, and a filter $fil_c$) are used as weight filters. The image data input to the convolutional layer CL is subjected to filter processing using the filters $fil_a$, $fil_b$, and $fil_c$, so that data $D_a$, $D_b$, and $D_c$ are generated.

The data $D_a$, $D_b$, and $D_c$ subjected to the convolutional processing are converted using an activation function, and then output to the pooling layer PL, for example. As the activation function, a ReLU (Rectified Linear Units) or the like can be used, for example. ReLU is a function that outputs "0" when an input value is negative and outputs the input value as it is when the input value is greater than or equal to "0". Alternatively, as the activation function, a sigmoid function, a tanh function, or the like can be used as well.

The pooling layer PL has a function of performing pooling on the image data input from the convolutional layer CL. Pooling is processing in which the image data is partitioned into a plurality of regions and predetermined data extracted from each of the regions are arranged in a matrix to form new data. By the pooling, the image data can be reduced while the features extracted by the convolutional layer CL remain. As the pooling processing, max pooling, average pooling, Lp pooling, or the like can be used.

In the CNN, feature extraction is performed using the above convolutional processing and pooling processing, for example. Note that the CNN may include a plurality of convolutional layers CL and/or a plurality of pooling layers PL. FIG. 4 illustrates, as an example, a structure in which z layers L (a layer $L_1$ to a layer $L_z$) (here, z is an integer greater than or equal to 1) each of which is formed of the convolutional layer CL and the pooling layer PL are provided and the convolutional processing and the pooling processing are performed z times. In this case, feature extraction can be performed in each layer L, which enables more advanced feature extraction. Note that FIG. 4 illustrates the layer $L_1$, the layer $L_2$, and the layer $L_z$, and the other layers L are omitted.

The fully connected layer FCL has a function of determining an image using the image data obtained through convolution and pooling, for example. The fully connected layer FCL has a structure in which all the nodes in one layer are connected to all the nodes in the next layer. The image data output from the convolutional layer CL or the pooling layer PL is a two-dimensional feature map and is unfolded into a one-dimensional feature map when input to the fully connected layer FCL. Then, the image data OPD obtained as a result of the inference by the fully connected layer FCL is output.

Note that the structure of the CNN is not limited to the structure in FIG. 4. For example, the pooling layer PL may be provided for a plurality of convolutional layers CL. Moreover, in the case where the positional information of the extracted feature is desired to be left as much as possible, the pooling layer PL may be omitted.

Furthermore, in the case of classifying images using the output data from the fully connected layer FCL, an output layer electrically connected to the fully connected layer FCL may be provided. The output layer can output a classification class using a softmax function or the like as a likelihood function.

In addition, the CNN can perform supervised learning using image data as learning data and teacher data. In the supervised learning, a backpropagation method can be used, for example. Owing to the learning in the CNN, the filter value of the weight filter, the weight coefficient of the fully connected layer, or the like can be optimized.

<Convolutional Processing>

Next, a specific example of the convolutional processing performed in the convolutional layer CL is described.

Figure 5A:
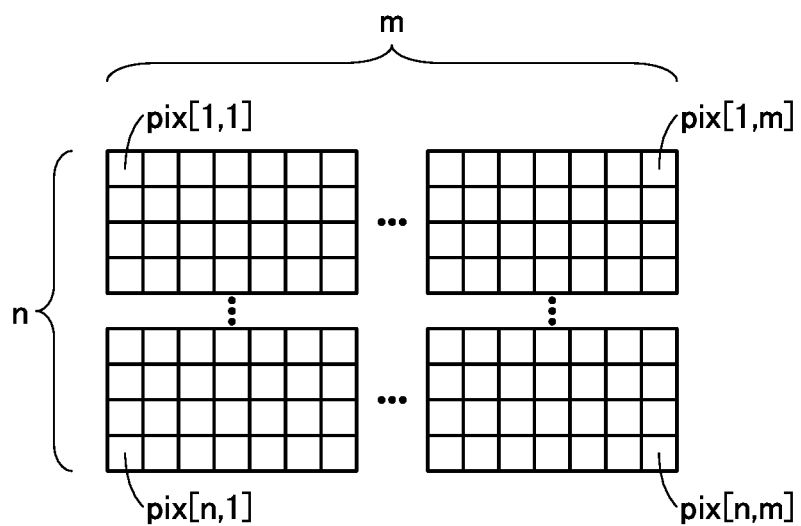
FIG. 5A is a diagram illustrating an example of a pixel structure.

FIG. 5A illustrates a plurality of pixels pix arranged in a matrix of n rows and m columns (here, n and m are each an integer greater than or equal to 1) in the imaging portion 110. In pixels pix[1, 1] to pix[n, m], g[1, 1] to g[n, m] are stored as image data, respectively.

Figure 5B:
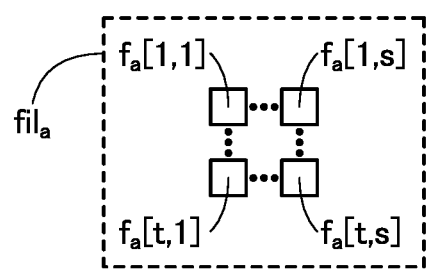
FIG. 5B is a diagram illustrating a structure example of a filter.

The convolution is performed by the product-sum operation using the image data g and the filter value of a weight filter. FIG. 5B illustrates the filter $fil_a$ with t rows and s columns (here, t is an integer greater than or equal to 1 and less than or equal to n, and s is an integer greater than or equal to 1 and less than or equal to m). A filter value $f_a[1, 1]$ to a filter value $f_a[t, s]$ are assigned to the respective addresses of the filter $fil_a$.

In the case of performing feature extraction by convolution, data showing certain features (referred to as feature data) can be stored as the filter value $f_a[1, 1]$ to the filter value $f_a[t, s]$. Then, in the feature extraction, the feature data and image data are compared with each other. In addition, in the case of performing image processing such as edge processing or blurring processing by convolution, parameters necessary for the image processing can be stored as the filter value $f_a[1, 1]$ to the filter value $f_a[t, s]$. As an example, the operation in the case of performing feature extraction is described in detail below.

Figure 6A:
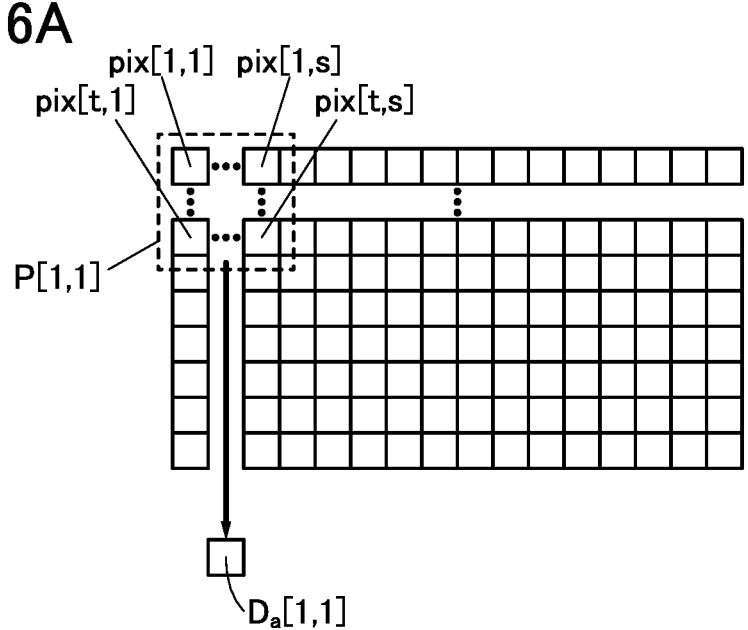
FIG. 6A and FIG. 6B are diagrams illustrating an example of convolutional processing.
Figure 6B:
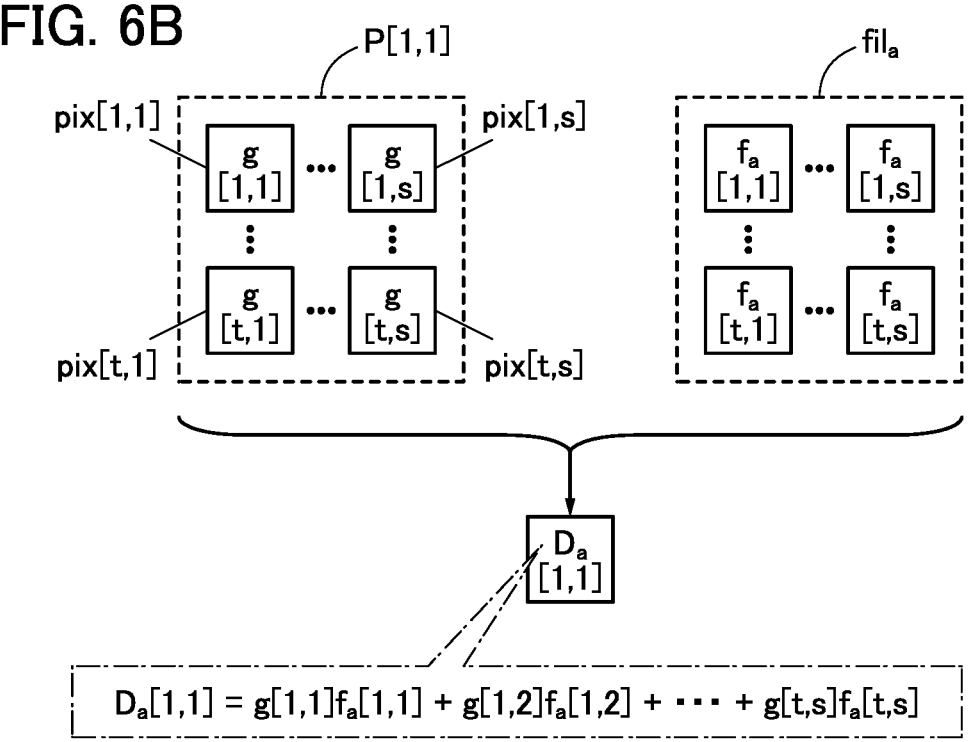

FIG. 6A illustrates a state where filter processing using the filter $fil_a$ is performed on a pixel region P[1, 1] whose corners are the pixel pix[1, 1], the pixel pix[1, s], the pixel pix[t, 1], and the pixel pix[t, s] to obtain data $D_a[1, 1]$. This filter processing is, as illustrated in FIG. 6B, processing in which pixel data included in one pixel pix included in the pixel region P[1, 1] is multiplied by the filter value $f_a$ of the filter $fil_a$ that corresponds to the address of the pixel pix, and the multiplication results for the pixels pix are added up together. In other words, the product-sum operation using the image data g[v, w] (here, v is an integer greater than or equal to 1 and less than or equal to t, and w is an integer greater than or equal to 1 and less than or equal to s) and the filter value $f_a[v, w]$ is performed in all the pixels pix included in the pixel region P[1, 1]. The data $D_a[1, 1]$ can be expressed by the following formula.

$$D_a[1, 1] = \sum_{v=1}^{t}\sum_{w=1}^{s} g[v, w] \cdot f_a[v, w] \qquad \text{[Formula 1]}$$

Figure 7:
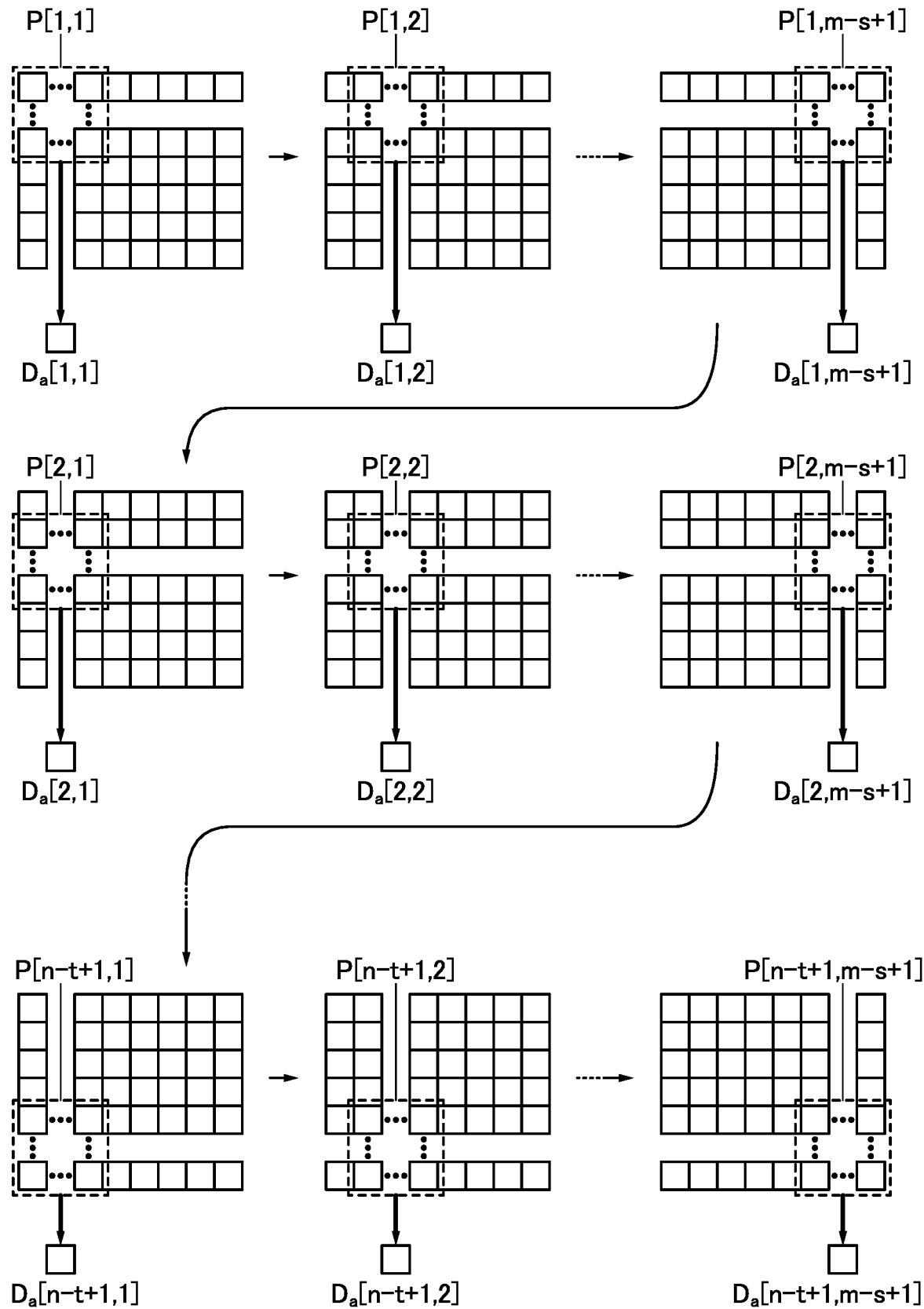
FIG. 7 is a diagram illustrating an example of convolutional processing.

After that, the above product-sum operation is sequentially performed also in other pixel regions. Specifically, as illustrated in FIG. 7, the filter processing is performed on a pixel region P[1, 2] whose corners are the pixel pix[1, 2], the pixel pix[1, s+1], the pixel pix[t, 2], and the pixel pix[t, s+1] to obtain data $D_a[1, 2]$. Subsequently, the data $D_a$ is obtained in each pixel region P in a similar manner while the pixel region P is moved pixel-column by pixel-column.

Then, data $D_a[1, m-s+1]$ is obtained from a pixel region P[1, m−s+1] whose corners are a pixel pix[1, m−s+1], a pixel pix[1, m], a pixel pix[t, m−s+1], and a pixel pix[t, m]. After the data $D_a$ is obtained in each of the pixel regions in one row, i.e., the pixel region P[1, 1] to the pixel region P[1, m−s+1], the pixel region P is moved by one pixel row and the data $D_a$ is sequentially obtained in the pixel row in a similar manner. FIG. 7 illustrates a state where data $D_a[2, 1]$ to data $D_a[2, m-s+1]$ are obtained from a pixel region P[2, 1] to a pixel region P[2, m−s+1].

When the above operation is repeated and data $D_a[n-t+1, m-s+1]$ is obtained from a pixel region P[n−t+1, m−s+1] whose corners are the pixel pix[n−t+1, m−s+1], the pixel pix[n−t+1, m], the pixel pix[n, m−s+1], and the pixel pix[n, m], the filter processing using the filter $fil_a$ on all pixel regions P is completed.

In such a manner, the pixel region P having pixels arranged in a matrix of t rows and s columns is selected from the pixel pix[1, 1] to the pixel pix[n, m] and the filter processing using the filter $fil_a$ is performed on the pixel region P. Data $D_a[x, y]$ obtained by performing the filter processing using the filter $fil_a$ on a pixel region P whose corners are the pixel pix[x, y] (here, x is an integer greater than or equal to 1 and less than or equal to n−t+1, and y is an integer greater than or equal to 1 and less than or equal to m−s+1), the pixel pix[x, y+s−1], the pixel pix[x+t−1, y], and the pixel pix[x+t−1, y+s−1] can be expressed by the following formula.

$$D_a[x, y] = \sum_{v=1}^{t}\sum_{w=1}^{s} g[x+v-1, y+w-1] \cdot f_a[v, w]$$ [Formula 2]

Figure 8:
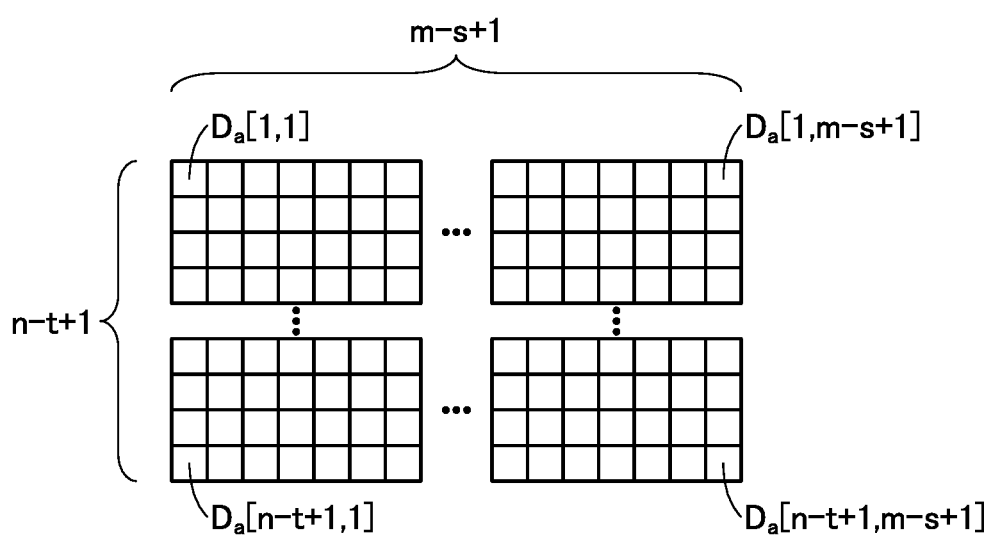
FIG. 8 is a diagram illustrating a structure example of a feature map.

As described above, the data $D_a[1, 1]$ to the data $D_a[n-t+1, m-s+1]$ can be obtained when the filter processing using the filter $fil_a$ is performed on all the pixel regions P in t rows and s columns that can be selected from the pixel pix[1, 1] to the pixel pix[n, m]. Then, the data $D_a[1, 1]$ to the data $D_a[n-t+1, m-s+1]$ are arranged in a matrix in accordance with the addresses, so that a feature map (a depth map depending on the case) illustrated in FIG. 8 can be obtained.

In the above manner, the convolutional processing is performed by the product-sum operation using the image data and the filter values to extract the feature of an image.

Note that in the case where a plurality of filters fil are provided in the convolutional layer CL as illustrated in FIG. 4, the above convolutional processing is performed for each filter $fil$.

Moreover, although described here is an example in which the pixel region P is moved by one pixel column or one pixel row, the moving distance of the pixel region P can be set freely.

Note that this embodiment can be combined with any of the other embodiments in this specification as appropriate.

Embodiment 3

In this embodiment, an example of the imaging device of one embodiment of the present invention is described with reference to drawings.

Figure 9A:
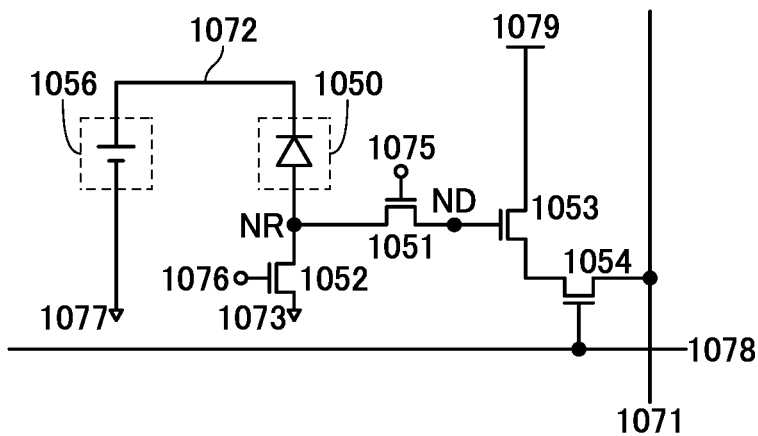
FIG. 9A is a diagram illustrating a pixel circuit.

FIG. 9A is a diagram illustrating a pixel circuit of the imaging device. The pixel circuit includes a photoelectric conversion element 1050, a transistor 1051, a transistor 1052, a transistor 1053, and a transistor 1054, for example.

One electrode (anode) of the photoelectric conversion element 1050 is electrically connected to one of a source and a drain of the transistor 1051. The one electrode of the photoelectric conversion element 1050 is electrically connected to one of a source and a drain of the transistor 1052. The other of the source and the drain of the transistor 1051 is electrically connected to a gate of the transistor 1053. One of a source and a drain of the transistor 1053 is electrically connected to one of a source and a drain of the transistor 1054. Note that a capacitor may be electrically connected to the gate of the transistor 1053.

The other electrode (cathode) of the photoelectric conversion element 1050 is electrically connected to a wiring 1072. A gate of the transistor 1051 is electrically connected to a wiring 1075. The other of the source and the drain of the transistor 1053 is electrically connected to a wiring 1079. A gate of the transistor 1052 is electrically connected to a wiring 1076. The other of the source and the drain of the transistor 1052 is electrically connected to a wiring 1073. The other of the source and the drain of the transistor 1054 is electrically connected to a wiring 1071. A gate of the transistor 1054 is electrically connected to a wiring 1078. The wiring 1072 is electrically connected to one terminal of a power source 1056, and the other terminal of the power source 1056 is electrically connected to a wiring 1077.

Here, the wiring 1071 has a function of, for example, an output line that outputs a signal from a pixel. The wiring 1073, the wiring 1077, and the wiring 1079 each have a function of a power supply line. Specifically, for example, the wiring 1073 and the wiring 1077 may function as low potential power supply lines and the wiring 1079 may function as a high potential power supply line. The wiring 1075, the wiring 1076, and the wiring 1078 each have a function of, for example, a signal line that controls switching of a conduction state and a non-conduction state of the corresponding transistor.

To increase light detection sensitivity in low illuminance, it is preferable to use a photoelectric conversion element that causes an avalanche multiplication effect as the photoelectric conversion element 1050. To cause the avalanche multiplication effect, a relatively high potential is needed. Here, the power source 1056 has a function of supplying HVDD as the relatively high potential. Thus, the potential HVDD is supplied to the other electrode of the photoelectric conversion element 1050 through the wiring 1072. Note that the photoelectric conversion element 1050 can be used when being supplied with a potential that does not cause the avalanche multiplication effect. Note that depending on the pixel circuit structure of the imaging device, it is not necessary to use a photoelectric conversion element that causes the avalanche multiplication effect as the photoelectric conversion element 1050.

The transistor 1051 can have a function of transferring the potential of a charge accumulation portion NR which changes in response to the output of the photoelectric conversion element 1050 to a charge detection portion ND. The transistor 1052 can have a function of initializing the potentials of the charge accumulation portion NR and the charge detection portion ND. The transistor 1053 can have a function of outputting a signal corresponding to the potential of the charge detection portion ND. The transistor 1054 can have a function of selecting a pixel from which a signal is read.

In the case where a high voltage is applied to the other electrode of the photoelectric conversion element 1050, a high withstand voltage transistor that can withstand a high voltage needs to be used as the transistor connected to the photoelectric conversion element 1050. As the high withstand voltage transistor, for example, an OS transistor or the like can be used. Specifically, OS transistors are preferably applied to the transistor 1051 and the transistor 1052.

Although the transistor 1051 and the transistor 1052 are desired to have excellent switching characteristics, the transistor 1053 is desired to have excellent amplifying characteristics; thus, a transistor with high on-state current is preferably used. Therefore, a transistor using silicon in an active layer or an active region (hereinafter referred to as a Si transistor) is preferably used as the transistor 1053 and the transistor 1054.

When the transistor 1051 to the transistor 1054 have the above structures, it is possible to manufacture an imaging device that has high light detection sensitivity in low illuminance and can output a signal with little noise. Owing to the high light detection sensitivity, light capturing time can be shortened and imaging can be performed at high speed.

Note that the structure is not limited to the above; OS transistors may be used as the transistor 1053 and the transistor 1054. Alternatively, Si transistors may be used as the transistor 1051 and the transistor 1052. In either case, imaging operation of the pixel circuit is possible.

Figure 9B:
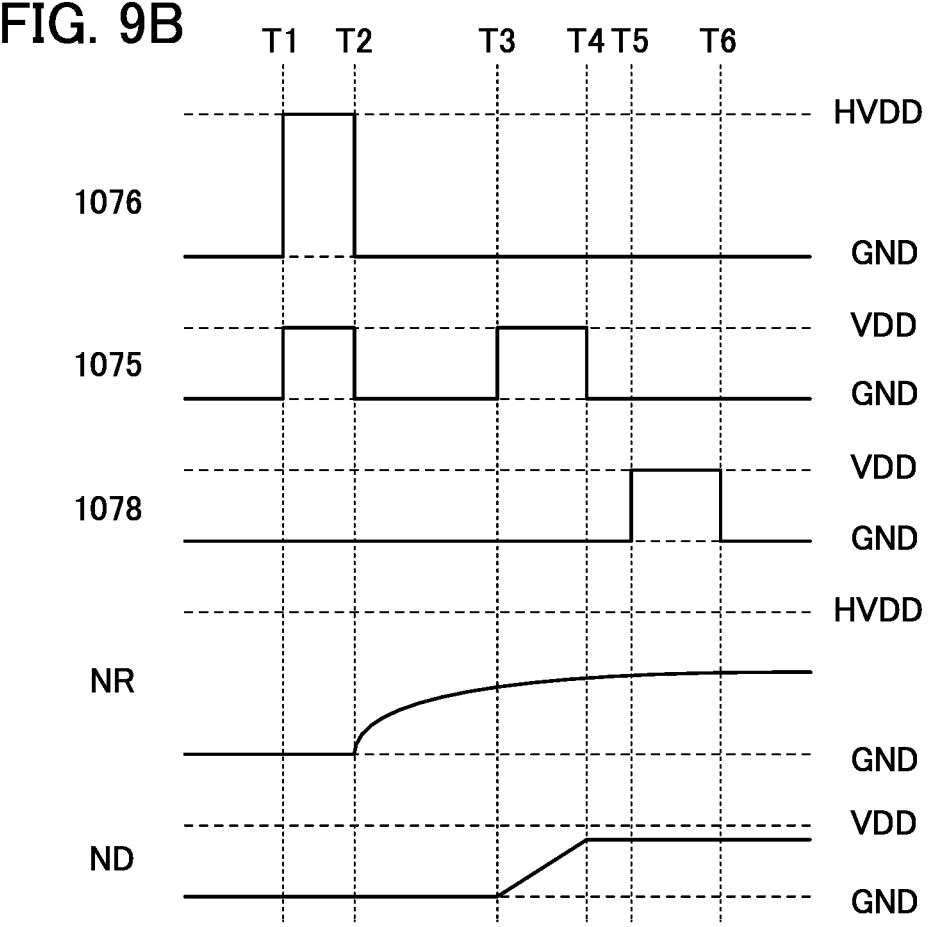
FIG. 9B is a timing chart showing an imaging operation.

Next, an operation example of a pixel is described with reference to a timing chart in FIG. 9B. Note that in an operation example described below, potentials HVDD and GND are supplied to the wiring 1076 connected to the gate of the transistor 1052 as "H" and "L," respectively. Potentials VDD and GND are supplied to the wiring 1075 connected to the gate of the transistor 1051 and the wiring 1078 connected to the gate of the transistor 1054 as "H" and "L," respectively. Furthermore, the potential VDD is supplied to the wiring 1079 connected to the source of the transistor 1053. Note that an embodiment can be employed in which potentials other than the above are supplied to the wirings.

In Time T1, the wiring 1076 is set at "H", the wiring 1075 is set at "H", and the potentials of the charge accumulation portion NR and the charge detection portion ND are each set to a reset potential (GND) (reset operation). Note that in reset operation, the potential VDD may be supplied to the wiring 1076 as "H."

At Time T2, the wiring 1076 is set at "L" and the wiring 1075 is set at "L," whereby the potential of the charge accumulation portion NR changes (accumulation operation). The potential of the charge accumulation portion NR changes from GND up to HVDD depending on the intensity of light entering the photoelectric conversion element 1050.

At Time T3, the wiring 1075 is set at "H" to transfer charge in the charge accumulation portion NR to the charge detection portion ND (transfer operation).

At Time T4, the wiring 1076 is set at "L" and the wiring 1075 is set at "L" to terminate the transfer operation. At this time, the potential of the charge detection portion ND is determined.

In a period from Time T5 to Time T6, the wiring 1076 is set at "L," the wiring 1075 is set at "L," and the wiring 1078 is set at "H" to output a signal corresponding to the potential of the charge detection portion ND to the wiring 1071. In other words, an output signal corresponding to the intensity of light entering the photoelectric conversion element 1050 in the accumulation operation can be obtained.

Figure 10A:
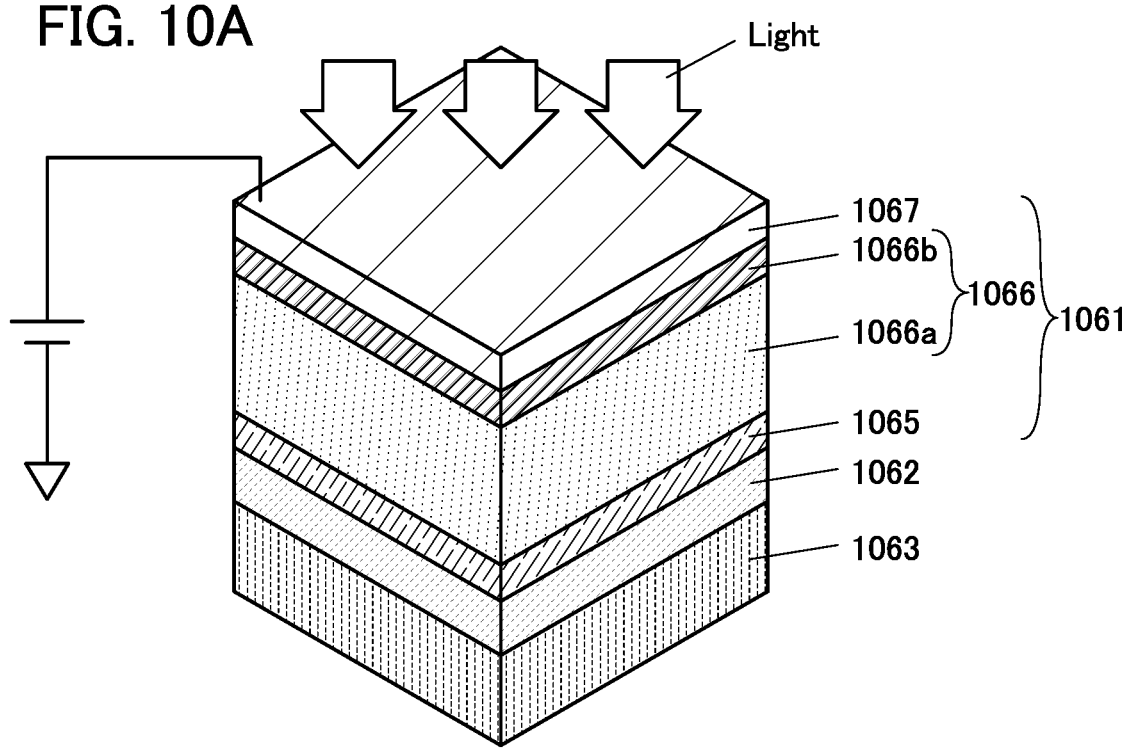
FIG. 10A is a schematic view illustrating a structure of a pixel of an imaging device.

FIG. 10A illustrates an example of a pixel structure of an imaging device including the above-described pixel circuit. The pixel can have a structure including a layer 1061, a layer 1062, and a layer 1063 that overlap with one another in a region.

The layer 1061 includes the components of the photoelectric conversion element 1050. The photoelectric conversion element 1050 includes an electrode 1065 corresponding to a pixel electrode, a photoelectric conversion portion 1066, and an electrode 1067 corresponding to a common electrode.

A low-resistance metal layer or the like is preferably used for the electrode 1065. For example, a metal such as aluminum, titanium, tungsten, tantalum, or silver, or a stacked layer of a plurality of kinds of metal selected from these can be used.

A conductive layer having a high light-transmitting property with respect to visible light (Light) is preferably used for the electrode 1067. For example, indium oxide, tin oxide, zinc oxide, indium tin oxide, gallium zinc oxide, indium gallium zinc oxide, graphene, or the like can be used. Note that a structure in which the electrode 1067 is omitted can be employed.

For the photoelectric conversion portion 1066, a pn-junction photodiode or the like containing a selenium-based material in a photoelectric conversion layer can be used, for example. A selenium-based material, which is a p-type semiconductor, is preferably used for a layer 1066a, and a gallium oxide or the like, which is an n-type semiconductor, is preferably used for a layer 1066b.

The photoelectric conversion element using a selenium-based material has characteristics of high external quantum efficiency with respect to visible light. The photoelectric conversion element can be a highly sensitive sensor in which electrons are greatly amplified with respect to the amount of incident light by utilizing the avalanche multiplication effect. A selenium-based material has a high light-absorption coefficient and thus has advantages in production; for example, a photoelectric conversion layer can be formed using a thin film. A thin film of a selenium-based material can be formed by a vacuum evaporation method, a sputtering method, or the like.

As a selenium-based material, crystalline selenium such as single crystal selenium or polycrystalline selenium, amorphous selenium, a compound of copper, indium, and selenium (CIS), a compound of copper, indium, gallium, and selenium (CIGS), or the like can be used.

An n-type semiconductor is preferably formed using a material with a wide band gap and a light-transmitting property with respect to visible light. For example, zinc oxide, gallium oxide, indium oxide, tin oxide, or mixed oxide thereof can be used. In addition, these materials have a function of a hole-injection blocking layer, so that a dark current can be decreased.

Note that the layer 1061 is not limited to the above structure; a pn-junction photodiode may be employed in which one of a p-type silicon semiconductor and an n-type silicon semiconductor is used for the layer 1066a and the other of a p-type silicon semiconductor and an n-type silicon semiconductor is used for the layer 1066b. Alternatively, a pin-junction photodiode may be employed in which an i-type silicon semiconductor layer is provided between the layer 1066a and the layer 1066b.

The pn-junction photodiode or the pin-junction photodiode can be formed using single crystal silicon. In that case, electrical bonding between the layer 1061 and the layer 1062 is preferably obtained through a bonding process. The pin-junction photodiode can also be formed using a thin film of amorphous silicon, microcrystalline silicon, polycrystalline silicon, or the like.

The layer 1062 can be, for example, a layer including OS transistors (the transistor 1051 and the transistor 1052). In the circuit structure of the pixel illustrated in FIG. 9A, the potential of the charge detection portion ND becomes low when the intensity of light entering the photoelectric conversion element 1050 is low. Since the OS transistor has an extremely low off-state current, a current corresponding to a gate potential can be accurately output even when the gate potential is extremely low. Thus, it is possible to widen the range of illuminance that can be detected, i.e., a dynamic range.

A period during which charge can be held at the charge detection portion ND and the charge accumulation portion NR can be extremely long owing to the low off-state current characteristics of the transistor 1051 and the transistor 1052. Therefore, a global shutter mode in which a charge accumulation operation is performed in all the pixels at the same time can be used without complicating the circuit structure and operation method.

The layer 1063 can be a support substrate or a layer including Si transistors (the transistor 1053 and the transistor 1054). The Si transistor can have a structure in which a single-crystal silicon substrate has an active region or a structure in which a crystalline silicon active layer is provided on an insulating surface. In the case where a single-crystal silicon substrate is used as the layer 1063, a pn-junction photodiode or a pin-junction diode may be formed in the single-crystal silicon substrate. In this case, the layer 1061 can be omitted.

Figure 10B:
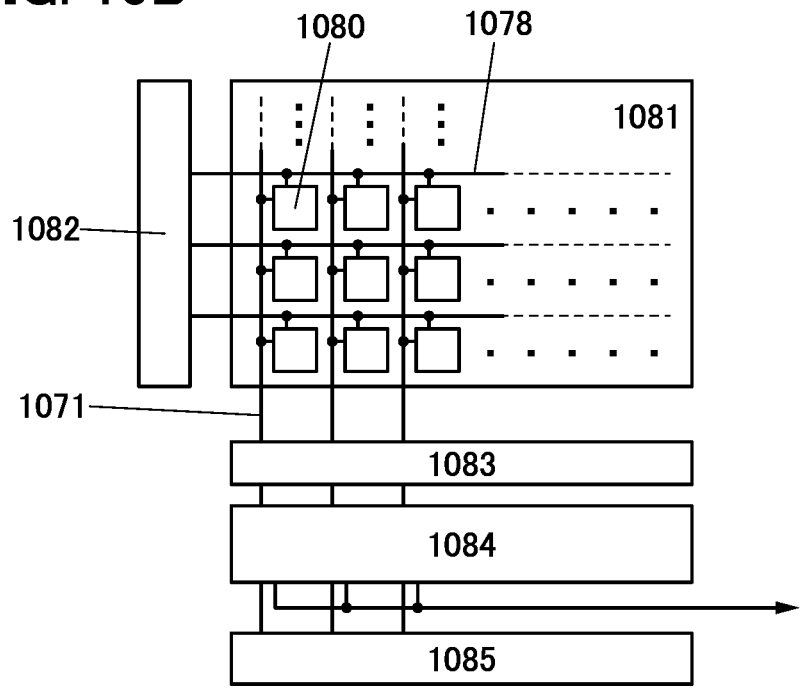
FIG. 10B is a block diagram of the imaging device.

FIG. 10B is a block diagram illustrating a circuit structure of the imaging device of one embodiment of the present invention. The imaging device includes a pixel array 1081 including pixels 1080 arranged in a matrix, a circuit 1082 (row driver) having a function of selecting a row of the pixel array 1081, a circuit 1083 (CDS circuit) for performing correlated double sampling on an output signal of the pixel 1080, a circuit 1084 (e.g., A/D converter circuit) having a function of converting analog data output from the circuit 1083 into digital data, and a circuit 1085 (column driver) having a function of selecting and reading data converted in the circuit 1084. Note that a structure in which the circuit 1083 is not provided can be employed.

For example, components of the pixel array 1081 except the photoelectric conversion element can be provided in the layer 1062 illustrated in FIG. 10A. Components such as the circuit 1082 to the circuit 1085 can be provided in the layer 1063. These circuits can be formed of CMOS circuits using silicon transistors.

With this structure, transistors suitable for their respective circuits can be used, and the area of the imaging device can be made small.

Figure 11A:
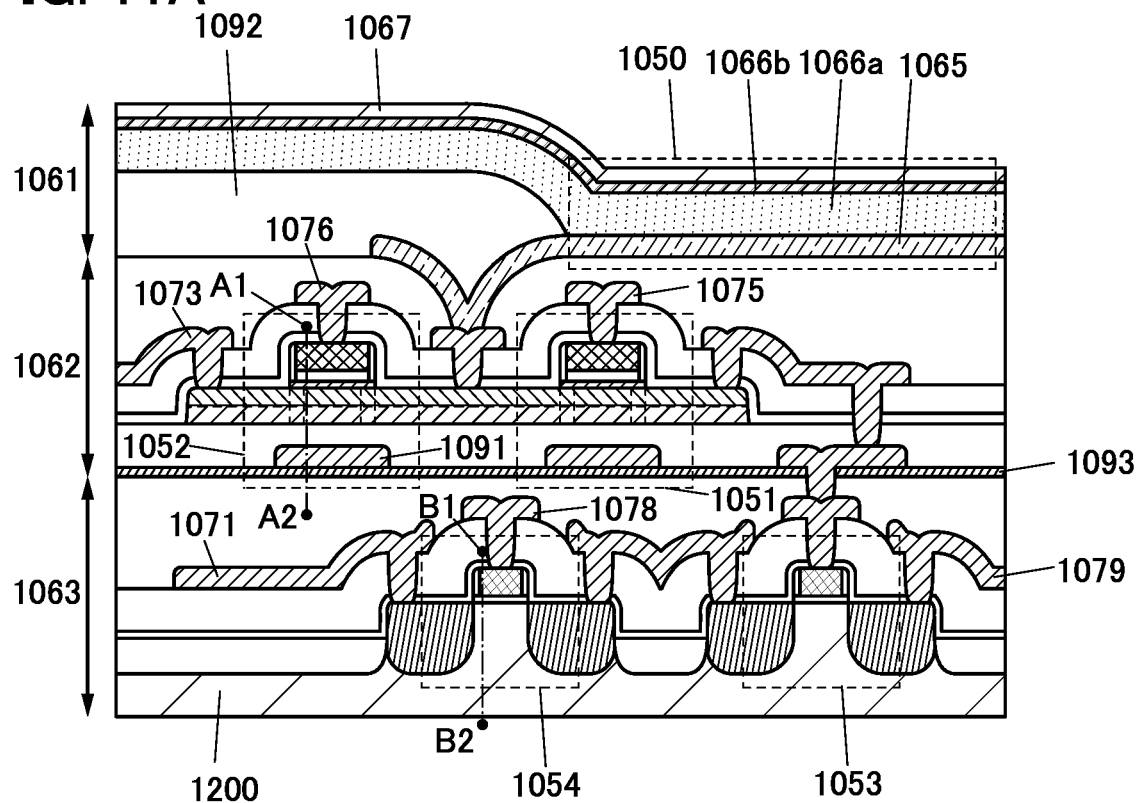
FIG. 11A to FIG. 11C are cross-sectional views illustrating a structure of an imaging device.
Figure 11B:
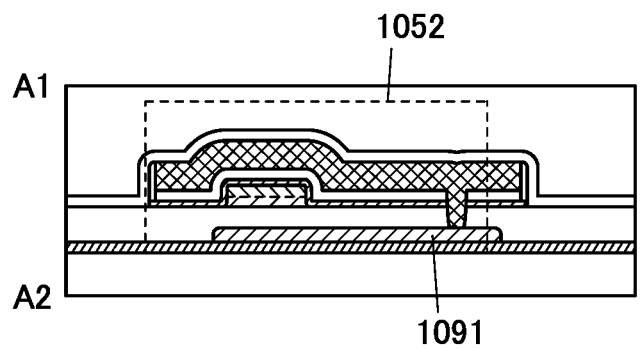
Figure 11C:
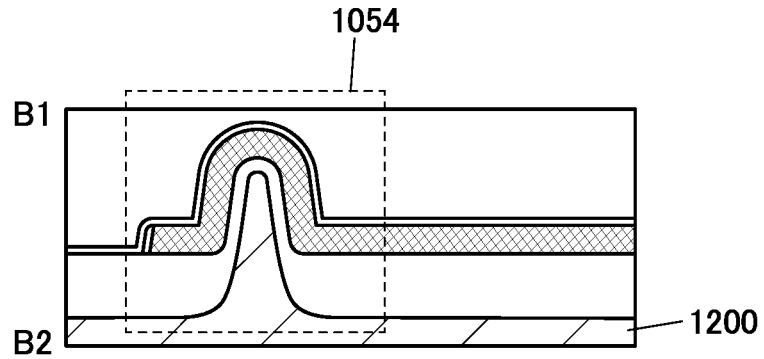

FIG. 11A to FIG. 11C are diagrams illustrating a specific structure of the imaging device illustrated in FIG. 10A. FIG. 11A is a cross-sectional view illustrating the transistor 1051, the transistor 1052, the transistor 1053, and the transistor 1054 in the channel length direction. FIG. 11B is a cross-sectional view taken along a dashed-dotted line A1-A2 illustrated in FIG. 11A, illustrating a cross section of the transistor 1052 in the channel width direction. FIG. 11C is a cross-sectional view taken along a dashed-dotted line B1-B2 illustrated in FIG. 11A, illustrating a cross section of the transistor 1054 in the channel width direction.

The imaging device can be a stack of the layer 1061 to the layer 1063. The layer 1061 can have a structure including a partition wall 1092 in addition to the photoelectric conversion element 1050 including a selenium layer. The partition wall 1092 is provided so as to cover a step due to the electrode 1065. The selenium layer used for the photoelectric conversion element 1050 has high resistance and has a structure not being divided between pixels.

The transistor 1051 and the transistor 1052, which are OS transistors, are provided in the layer 1062. Although the structure is illustrated in which the transistor 1051 and the transistor 1052 each include a back gate 1091, a mode may be employed in which either of the transistors includes the back gate, or a structure may be employed in which neither of the transistors include the back gate. As illustrated in FIG. 11B, the back gate 1091 might be electrically connected to a front gate of the transistor, which is provided to face the back gate. Alternatively, a structure may be employed in which a fixed potential that is different from that for the front gate can be supplied to the back gate 1091.

Figure 12A:
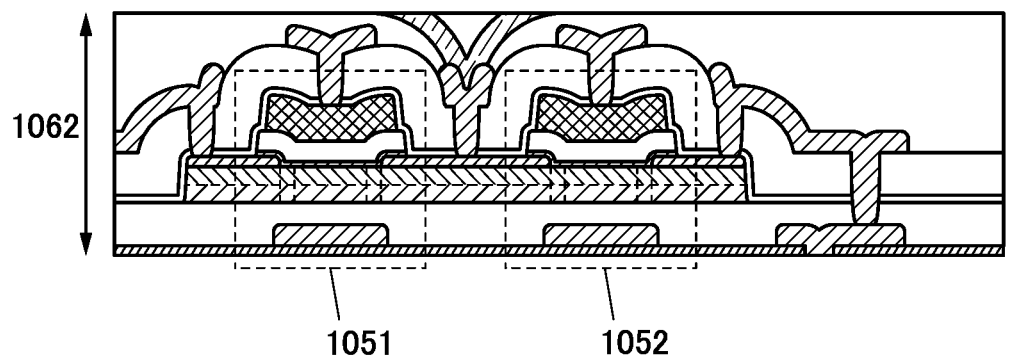
FIG. 12A to FIG. 12C are cross-sectional views illustrating structures of an imaging device.

Although FIG. 11A illustrates an example in which an OS transistor is a self-aligned top-gate transistor, a non-self-aligned transistor may be used as illustrated in FIG. 12A.

Figure 12B:
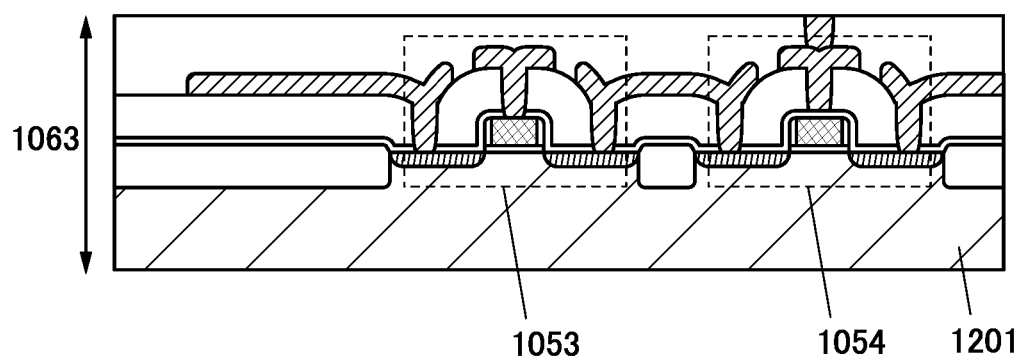
Figure 12C:
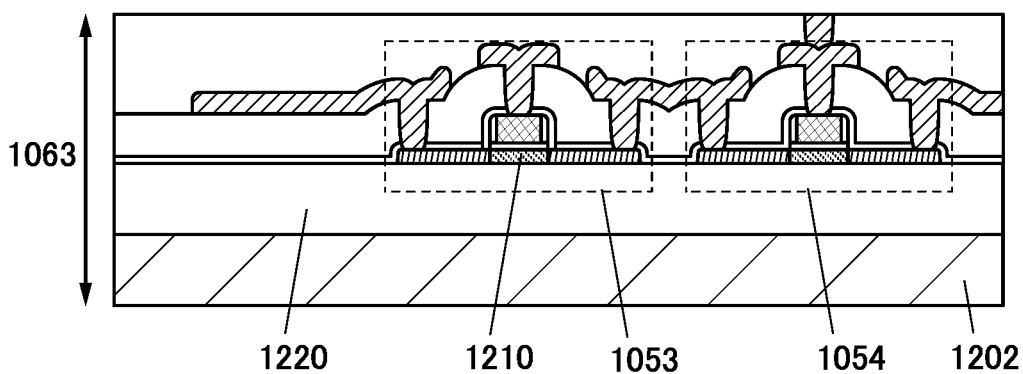

The transistor 1053 and the transistor 1054, which are Si transistors, are provided in the layer 1063. Although FIG. 11A illustrates, as an example, a structure in which the Si transistor includes a fin-type semiconductor layer provided in a silicon substrate 1200, a planar type including an active region in a silicon substrate 1201 may be used as illustrated in FIG. 12B. Alternatively, as illustrated in FIG. 12C, transistors each including a semiconductor layer 1210 of a silicon thin film may be used. The semiconductor layer 1210 can be, for example, single crystal silicon formed on an insulating layer 1220 on a silicon substrate 1202 (SOI (Silicon On Insulator)). Alternatively, polycrystalline silicon formed on an insulating surface of a glass substrate or the like may be used. In addition, a circuit for driving a pixel can be provided in the layer 1063.

An insulating layer 1093 having a function of inhibiting diffusion of hydrogen is provided between a region where OS transistors are formed and a region where Si transistors are formed. Dangling bonds of silicon are terminated with hydrogen in insulating layers provided in the vicinities of the active regions of the transistor 1053 and the transistor 1054. Meanwhile, hydrogen in the insulating layers provided in the vicinity of oxide semiconductor layers, which are the active layers of the transistor 1051 and the transistor 1052, is one factor of generation of carriers in the oxide semiconductor layers.

Hydrogen is confined in one layer by the insulating layer 1093, so that the reliability of the transistor 1053 and the transistor 1054 can be improved. Furthermore, diffusion of hydrogen from one layer to the other layer is inhibited, so that the reliability of the transistor 1051 and the transistor 1052 can also be improved.

For the insulating layer 1093, for example, aluminum oxide, aluminum oxynitride, gallium oxide, gallium oxynitride, yttrium oxide, yttrium oxynitride, hafnium oxide, hafnium oxynitride, yttria-stabilized zirconia (YSZ), or the like can be used.

Figure 13A:
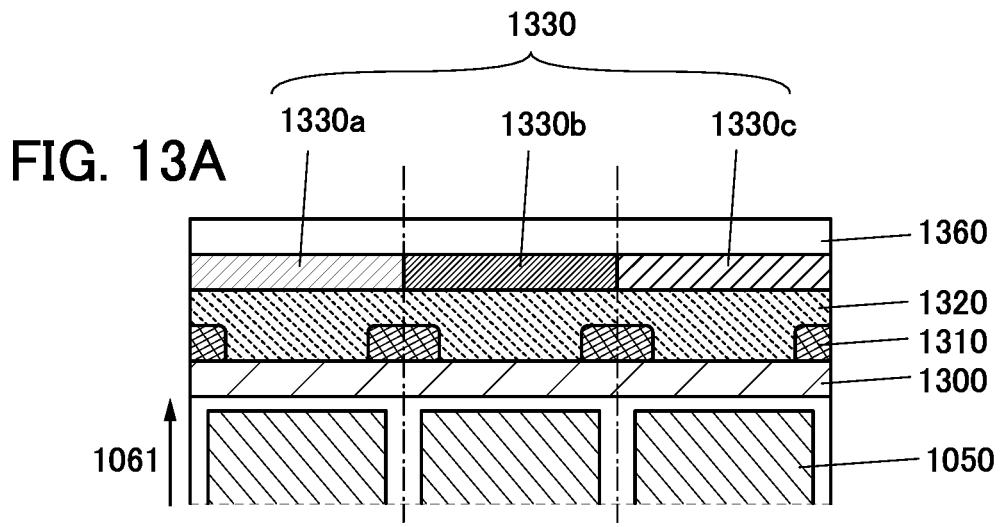
FIG. 13A to FIG. 13C are cross-sectional views illustrating structures of an imaging device.

FIG. 13A is a cross-sectional view illustrating an example in which a color filter and the like are added to the imaging device of one embodiment of the present invention. The cross-sectional view illustrates part of a region including pixel circuits for three pixels. An insulating layer 1300 is formed over the layer 1061 in which the photoelectric conversion element 1050 is formed. For the insulating layer 1300, a silicon oxide film with a high light transmitting property in the visible light region can be used, for example.

In addition, a silicon nitride film may be stacked as a passivation film. A dielectric film of hafnium oxide or the like may be stacked as an anti-reflection film.

A light-blocking layer 1310 may be formed over the insulating layer 1300. The light-blocking layer 1310 has a function of inhibiting color mixing of light passing through the upper color filter. As the light-blocking layer 1310, a metal layer of aluminum, tungsten, or the like can be used. The metal layer and a dielectric film having a function of an anti-reflection film may be stacked.

An organic resin layer 1320 can be provided as a planarization film over the insulating layer 1300 and the light-blocking layer 1310. A color filter 1330 (a color filter 1330*a*, a color filter 1330*b*, or a color filter 1330*c*) is formed in each pixel. For example, the color filter 1330*a*, the color filter 1330*b*, and the color filter 1330*c* each have a color of R (red), G (green), B (blue), Y (yellow), C (cyan), M (magenta), or the like, so that a color image can be obtained.

An insulating layer 1360 having a light-transmitting property with respect to visible light can be provided over the color filter 1330, for example.

Figure 13B:
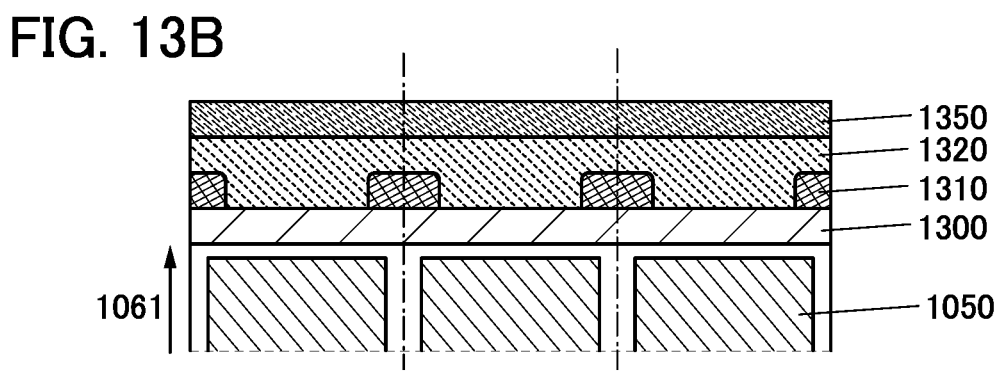

As illustrated in FIG. 13B, an optical conversion layer 1350 may be used instead of the color filter 1330. Such a structure enables the imaging device to obtain images in various wavelength regions.

For example, when a filter that blocks light having a wavelength shorter than or equal to that of visible light is used as the optical conversion layer 1350, an infrared imaging device can be obtained. When a filter that blocks light having a wavelength shorter than or equal to that of near infrared light is used as the optical conversion layer 1350, a far-infrared imaging device can be obtained. When a filter that blocks light having a wavelength longer than or equal to that of visible light is used as the optical conversion layer 1350, an ultraviolet imaging device can be obtained.

Furthermore, when a scintillator is used as the optical conversion layer 1350, an imaging device that obtains an image visualizing the intensity of radiation, which is used as an X-ray imaging device or the like, can be obtained. Radiation such as X-rays passes through a subject and enters the scintillator, and then is converted into light (fluorescence) such as visible light or ultraviolet light owing to a photoluminescence phenomenon. Then, the photoelectric conversion element 1050 detects the light to obtain image data. Furthermore, the imaging device having this structure may be used in a radiation detector or the like.

A scintillator contains a substance that, when irradiated with radiation such as X-rays or gamma-rays, absorbs energy of the radiation to emit visible light or ultraviolet light. For example, a resin or ceramics in which $Gd_2O_2S$:Tb, $Gd_2O_2S$:Pr, $Gd_2O_2S$:Eu, $BaFCl$:Eu, NaI, CsI, $CaF_2$, $BaF_2$, $CeF_3$, LiF, LiI, ZnO, or the like is dispersed can be used.

In the photoelectric conversion element 1050 containing a selenium-based material, radiation such as X-rays can be directly converted into charge; thus, a structure that does not require a scintillator can be employed.

Figure 13C:
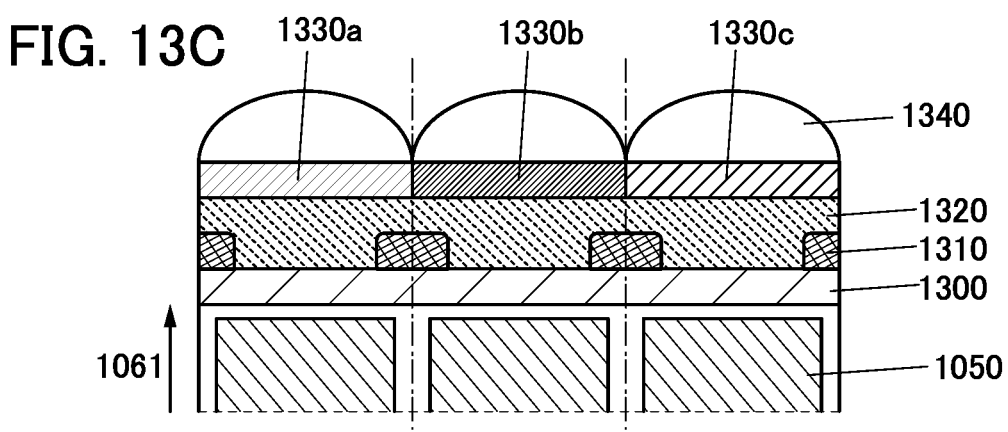

As illustrated in FIG. 13C, a microlens array 1340 may be provided over the color filter 1330*a*, the color filter 1330*b*, and the color filter 1330*c*. Light passing through lenses included in the microlens array 1340 goes through the color filters positioned thereunder to enter the photoelectric conversion element 1050. The microlens array 1340 may be provided over the optical conversion layer 1350 illustrated in FIG. 13B.

Examples of a package and a camera module in each of which an image sensor chip is placed are described below. For the image sensor chip, the structure of the above imaging device can be used.

Figure 14A:
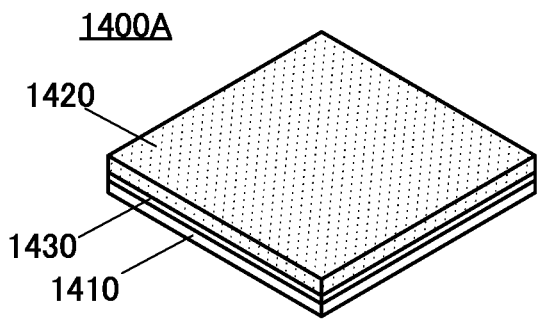
FIG. 14A to FIG. 14F are perspective views of packages including an imaging device.

FIG. 14A is an external perspective view of the top surface side of a package in which an image sensor chip is placed. A package 1400A includes a package substrate 1410 to which an image sensor chip 1450 is fixed, a cover glass 1420, an adhesive 1430 for bonding the package substrate 1410 and the cover glass 1420, and the like.

Figure 14B:
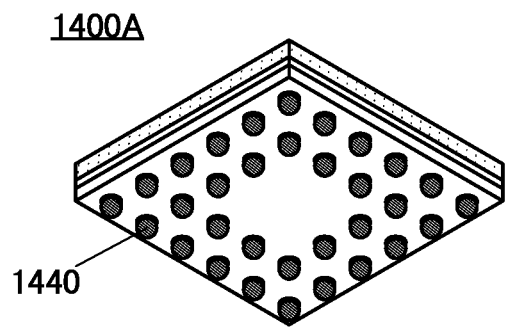

FIG. 14B is an external perspective view of the bottom surface side of the package 1400A. A BGA (Ball Grid Array) structure in which solder balls are used as bumps 1440 on the bottom surface of the package is employed. Note that, without being limited to the BGA, an LGA (Land Grid Array), a PGA (Pin Grid Array), or the like may be employed.

Figure 14C:
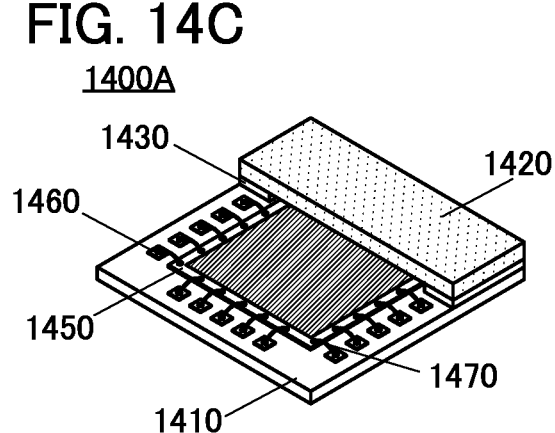

FIG. 14C is a perspective view of the package 1400A, in which parts of the cover glass 1420 and the adhesive 1430 are not illustrated. Electrode pads 1460 are formed over the package substrate 1410, and the electrode pads 1460 and the bumps 1440 are electrically connected to each other via through-holes. The electrode pads 1460 are electrically connected to the image sensor chip 1450 through wires 1470.

Figure 14D:
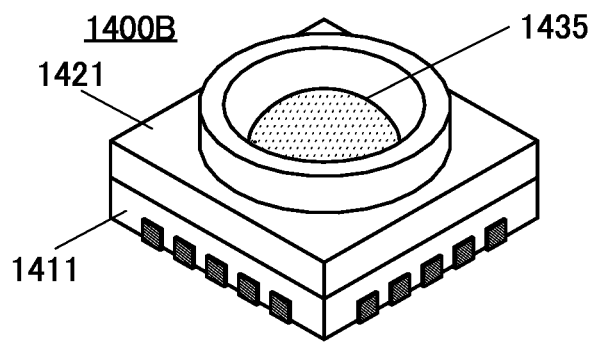

FIG. 14D is an external perspective view of the top surface side of a camera module in which an image sensor chip is placed in a package with a built-in lens. A camera module 1400B includes a package substrate 1411 to which an image sensor chip 1451 is fixed, a lens cover 1421, a lens 1435, and the like. Furthermore, an IC chip 1490 having a function of a driver circuit, a signal conversion circuit, or the like of an imaging device is provided between the package substrate 1411 and the image sensor chip 1451; thus, the structure as a SiP (System in package) is formed.

Figure 14E:
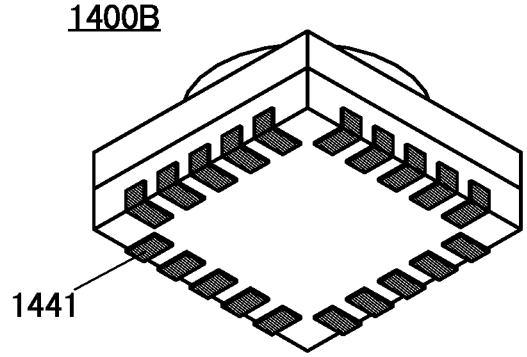

FIG. 14E is an external perspective view of the bottom surface side of the camera module 1400B. A QFN (Quad Flat No-lead package) structure in which lands 1441 for mounting are provided on the bottom surface and side surfaces of the package substrate 1411 is employed. Note that this structure is only an example, and a QFP (Quad Flat Package), the above-mentioned BGA, or the like may also be employed.

Figure 14F:
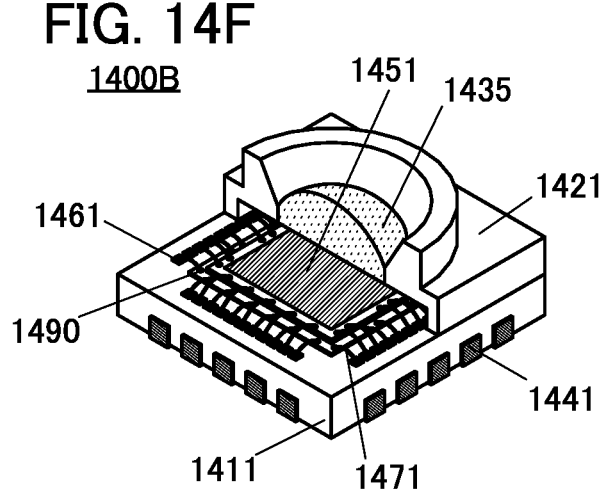

FIG. 14F is a perspective view of the camera module 1400B, in which parts of the lens cover 1421 and the lens 1435 are not illustrated. The lands 1441 are electrically connected to electrode pads 1461, and the electrode pads 1461 are electrically connected to the image sensor chip 1451 or the IC chip 1490 through wires 1471.

The image sensor chip placed in a package or a camera module having the above form can be easily mounted on a printed substrate or the like, and the image sensor chip can be incorporated into a variety of semiconductor devices and electronic devices.

Note that this embodiment can be combined with any of the other embodiments in this specification as appropriate.

Embodiment 4

Figure 15:
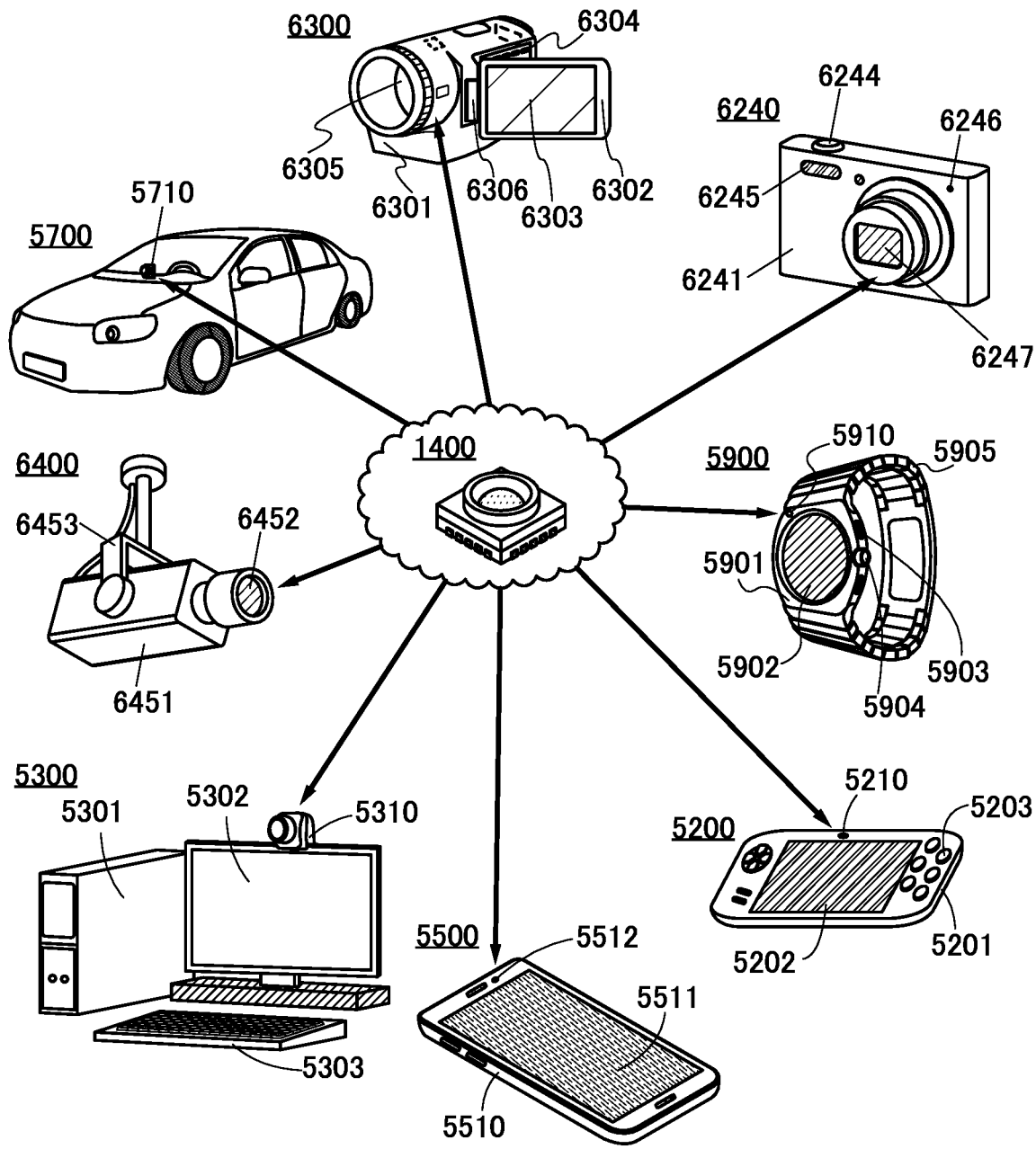
FIG. 15 is a perspective view illustrating examples of electronic devices.

This embodiment describes examples of electronic devices including the structure of the AI system described in the above embodiment. FIG. 15 illustrates electronic devices each including an imaging device including a camera module 1400. Although FIG. 15 illustrates the camera module 1400B in FIG. 14D to FIG. 14F described in Embodiment 3 as the camera module 1400, the camera module 1400 may be the package 1400A in FIG. 14A to FIG. 14C described in Embodiment 3, instead of the camera module 1400B.

[Moving Vehicle]

The camera module 1400 can be used, for example, for an imaging device that can be provided for an automobile that is a moving vehicle or around the driver's seat of the automobile.

FIG. 15 illustrates an automobile 5700 that is an example of a moving vehicle. The automobile 5700 includes an imaging device 5710. The imaging device 5710 is provided on the inner side of a windshield in FIG. 15, but may be provided on the inner side of a rear glass or on a bonnet, a roof, a pillar, a bumper, a side sill, or the like.

An instrument panel that can display a speedometer, a tachometer, a mileage, a fuel meter, a gearshift state, air-conditioning setting, and the like is provided around the driver's seat in the automobile 5700. In addition, a display device showing the above information may be provided around the driver's seat.

In particular, the display device can compensate for the view obstructed by the pillar or the like, the blind areas for the driver's seat, and the like by displaying an image taken by the imaging device 5710 provided for the automobile 5700, which improves safety.

Since the imaging device described in the above embodiment can be used as the components of artificial intelligence, the computer can be used for an automatic driving system of the automobile 5700, for example. The computer can also be used for a system for navigation, risk prediction, or the like. The display device may display navigation information, risk prediction information, or the like.

Note that although an automobile is described above as an example of a moving vehicle, the moving vehicle is not limited to an automobile. Examples of the moving vehicle include a train, a monorail train, a ship, and a flying vehicle (a helicopter, an unmanned aircraft (a drone), an airplane, and a rocket), and these moving vehicles can each include the system of one embodiment of the present invention which utilizes artificial intelligence.

[Video Camera]

The camera module 1400 can be used for a video camera, for example.

FIG. 15 illustrates a video camera 6300 that is an example of an imaging device. The video camera 6300 includes a first housing 6301, a second housing 6302, a display portion 6303, operation keys 6304, a lens 6305, a joint 6306, and the like. The operation keys 6304 and the lens 6305 are provided in the first housing 6301, and the display portion 6303 is provided in the second housing 6302. The camera module 1400 is provided on the inner side of the lens 6305. In particular, in the case where the camera module 1400 is the camera module 1400B described in the above embodiment, the lens 6305 can be the lens 1435 of the camera module 1400B.

The first housing 6301 and the second housing 6302 are connected to each other with the joint 6306, and the angle between the first housing 6301 and the second housing 6302 can be changed with the joint 6306. Images displayed on the display portion 6303 may be changed in accordance with the angle at the joint 6306 between the first housing 6301 and the second housing 6302.

By using the camera module 1400 described in the above embodiment for the video camera 6300, a depth can be added to an image taken by the video camera 6300. Furthermore, the video camera 6300 can have a function of automatically recognizing a subject such as a face or an object, a function of adjusting a focus on the subject, a function of toning a captured image, or the like.

[Camera]

The camera module 1400 can be used for a camera, for example.

FIG. 15 illustrates a digital camera 6240 that is an example of an imaging device. The digital camera 6240 includes a housing 6241, a shutter button 6244, a light-emitting portion 6245, a microphone 6246, a lens 6247, and the like. Note that the camera module 1400 is provided on the inner side of the lens 6247, for example. In particular, in the case where the camera module 1400 is the camera module 1400B described in the above embodiment, the lens 6247 can be the lens 1435 of the camera module 1400B.

The lens 6247 may be detachable from the digital camera 6240. Alternatively, the lens 6247 and the housing 6241 may be integrated with each other in the digital camera 6240. A viewfinder or the like may be additionally attached to the digital camera 6240.

When the semiconductor device described in the above embodiment is used for the digital camera 6240, the digital camera 6240 with low power consumption can be achieved.

Furthermore, heat generation from a circuit can be reduced owing to low power consumption; thus, the influence of heat generation on the circuit itself, the peripheral circuit, and the module can be reduced.

Furthermore, when the camera module 1400 described in the above embodiment is used for the digital camera 6240, the digital camera 6240 including artificial intelligence can be achieved. By utilizing the artificial intelligence, the digital camera 6240 can add a depth obtained by depth estimation to a captured image. In addition, the digital camera 6240 can have a function of automatically recognizing a subject such as a face or an object, a function of adjusting a focus on the subject, a function of automatically using a flash in accordance with environments, a function of toning a captured image, or the like.

[Surveillance Camera]

The camera module 1400 can be used for a surveillance camera, for example.

FIG. 15 illustrates a surveillance camera 6400 that is an example of an imaging device. The surveillance camera 6400 includes a housing 6451, a lens 6452, a support 6453 and the like. Note that the camera module 1400 is provided on the inner side of the lens 6452, for example. In particular, in the case where the camera module 1400 is the camera module 1400B described in the above embodiment, the lens 6452 can be the lens 1435 of the camera module 1400B.

Note that a surveillance camera is a name in common use and does not limit the use thereof. For example, a device having a function as a surveillance camera is also referred to as a camera or a video camera.

[Wearable Terminal]

The camera module 1400 can be used for a wearable terminal, for example.

FIG. 15 illustrates a wearable terminal 5900 that is an example of an information terminal. The wearable terminal 5900 includes a housing 5901, a display portion 5902, operation buttons 5903, a crown 5904, a band 5905, a camera 5910, and the like. The camera module 1400 is included in the camera 5910, specifically.

By using the camera module 1400 described in the above embodiment, the wearable terminal 5900 can perform depth estimation utilizing artificial intelligence on a captured image.

[Desktop Information Terminal]

The camera module 1400 can be used for, for example, an imaging device that can be provided for a desktop information terminal. Note that the imaging device is sometimes referred to as a web camera.

FIG. 15 illustrates a desktop information terminal 5300. The desktop information terminal 5300 includes a main body 5301 of the information terminal, a display 5302, a keyboard 5303, and a web camera 5310. The camera module 1400 is included in the web camera 5310, specifically.

Like the wearable terminal 5900 described above, the web camera 5310 can perform depth estimation utilizing artificial intelligence on a captured image by using the camera module 1400 described in the above embodiment. The desktop information terminal 5300 can use an image to which a depth is added for a variety of applications.

[Mobile Phone]

The camera module 1400 can be used for an imaging device that can be provided for a mobile phone.

FIG. 15 illustrates an information terminal 5500 that is an example of a mobile phone (smartphone). The information terminal 5500 includes a housing 5510, a display portion 5511, and a camera 5512. The camera module 1400 is included in the camera 5512, specifically. In addition, a touch panel is provided in the display portion 5511 and a button is provided in the housing 5510 as input interfaces.

Like the wearable terminal 5900 and the web camera 5310 described above, the information terminal 5500 can perform depth estimation utilizing artificial intelligence on a captured image by using the camera module 1400 described in the above embodiment.

[Game Machines]

The camera module 1400 can be used for an imaging device that can be provided for a game machine.

FIG. 15 illustrates a portable game machine 5200 that is an example of a game machine. The portable game machine 5200 includes a housing 5201, a display portion 5202, a button 5203, a camera 5210, and the like. The camera module 1400 is included in the camera 5210, specifically.

Although FIG. 15 illustrates the portable game machine as an example of a game machine, the camera module 1400 may be provided for a game machine with a different mode. Examples of the game machine with a different embodiment include a home stationary game machine, an arcade game machine installed in entertainment facilities (e.g., a game center and an amusement park), and a throwing machine for batting practice installed in sports facilities. That is, an imaging device including the camera module 1400 described in the above embodiment can be provided for these electronic devices.

[Other Electronic Devices]

FIG. 15 illustrates a variety of electronic devices, and an imaging device including the camera module 1400 can be provided also for other electronic devices not illustrated in FIG. 15. Specifically, for example, the imaging device can be provided for a display apparatus such as a television receiver, an e-book reader, a goggles-type display (a head-mounted display), a copier, a facsimile, a printer, a multi-function printer, an automated teller machine (ATM), a vending machine, or the like. The imaging device may be provided for an electrical appliance such as an electric refrigerator-freezer, a vacuum cleaner, a microwave oven, an electric oven, a rice cooker, a water heater, an IH (Induction Heating) cooker, a water server, a heating-cooling combination appliance such as an air conditioner, a washing machine, a drying machine, or an audio visual appliance.

Note that this embodiment can be combined with any of the other embodiments in this specification as appropriate.

REFERENCE NUMERALS

ST1: step, ST2: step, ST3: step, ST4: step, ST5: step, ST6: step, ST7: step, ST8: step, CD1: image data, CD2: image data, CD3: image data, CD4: image data, CD5: image data, RD1: image data, RD2: image data, RD3: image data, RD4: image data, CP1: processing, CP2: processing, CP3: processing, CP4: processing, CP5: processing, CP6: processing, RP1: processing, RP2: processing, RP3: processing, RP4: processing, RP5: processing, CL: convolutional layer, PL: pooling layer, FCL: fully connected layer, $L_1$: layer, $L_2$: layer, $L_z$: layer, IPD: image data, OPD: image data, 10: light, 100: imaging device, 110: imaging portion, 120: processing portion, 130: memory portion, 140: arithmetic portion, 200: arithmetic circuit, 210: multiplication unit, 220: addition unit, 230: activation function circuit, 240: pooling processing portion, 250: memory portion, 300: control circuit, 400: memory device, 1050: photoelectric conversion element, 1051: transistor, 1052: transistor, 1053: transistor, 1054: transistor, 1056: power source, 1061: layer, 1062: layer, 1063: layer, 1065: electrode, 1066: photoelectric conversion portion, 1066a: layer, 1066b: layer, 1067: electrode, 1071: wiring, 1072: wiring, 1073: wiring, 1075: wiring, 1076: wiring, 1077: wiring, 1078: wiring, 1079: wiring, 1080: pixel, 1082: circuit, 1081: pixel array, 1083: circuit, 1084: circuit, 1085: circuit, 1091: back gate, 1092: partition wall, 1093: insulating layer, 1200: silicon substrate, 1201: silicon substrate, 1202: silicon substrate, 1210: semiconductor layer, 1220: insulating layer, 1300: insulating layer, 1310: light-blocking layer, 1320: organic resin layer, 1330: color filter, 1330a: color filter, 1330b: color filter, 1330c: color filter, 1340: microlens array, 1350: photoelectric conversion layer, 1360: insulating layer, 1400: camera module, 1400A: package, 1400B: camera module, 1410: package substrate, 1411: package substrate, 1420: cover glass, 1421: lens cover, 1430: adhesive, 1435: lens, 1440: bump, 1441: land, 1450: image sensor chip, 1451: image sensor chip, 1460: electrode pad, 1461: electrode pad, 1470: wire, 1471: wire, 1490: IC chip, 5200: portable game machine, 5201: housing, 5202: display portion, 5203: button, 5210: camera, 5300: desktop information terminal, 5301: main body, 5302: display, 5303: keyboard, 5310: web camera, 5500: information terminal, 5510: housing, 5511: display portion, 5512: camera, 5700: car, 5710: imaging device, 5900: wearable terminal, 5901: housing, 5902: display portion, 5903: operation button, 5904: crown, 5905: band, 5910: camera, 6240: digital camera, 6241: housing, 6244: shutter button, 6245: light-emitting portion, 6246: microphone, 6247: lens, 6300: video camera, 6301: first housing, 6302: second housing, 6303: display portion, 6304: operation key, 6305: lens, 6306: joint, 6400: surveillance camera, 6451: housing, 6452: lens, 6453: support.

The invention claimed is:

1. A system comprising:

an imaging device and an arithmetic circuit, wherein the imaging device comprises an imaging portion, a first memory portion, and an arithmetic portion, wherein the arithmetic circuit comprises a second memory portion, wherein the imaging portion is configured to convert light reflected by an external object into image data, wherein the first memory portion is configured to store the image data, a first filter for performing first convolutional processing in a first layer of a first neural network, and a second filter for performing second convolutional processing in a first layer of a second neural network, wherein the arithmetic portion is configured to perform the first convolutional processing on the image data using the first filter as multiplier data and a partial region of the image data as multiplicand data to generate first data, wherein the arithmetic portion is configured to perform the second convolutional processing on the image data using the second filter to generate second data, wherein the second memory portion is configured to store the first data, the second data, and a plurality of filters for performing convolutional processing in a second layer and subsequent layers of the first neural network and in a fourth layer and subsequent layers of the second neural network, wherein the arithmetic circuit is configured to perform processing in the second layer and the subsequent layers of the first neural network using the first data to output third data from an output layer of the first neural network, wherein the arithmetic circuit is configured to perform pooling processing on the second data in the second layer of the second neural network to generate fourth data, wherein the arithmetic circuit is configured to combine the third data and the fourth data in a third layer of the second neural network to generate fifth data, and wherein the arithmetic circuit is configured to perform processing in the fourth layer and subsequent layers of the second neural network using the fifth data to output a depth map of the image data from an output layer of the second neural network;

wherein the arithmetic circuit is configured to determine an image using the image data obtained through the convolutional processing and the pooling processing in a fully connected layer of the second neural network, wherein the fully connected layer has a structure in which all nodes in one layer are connected to all nodes in a subsequent layer, and wherein the arithmetic circuit is configured to generate a three-dimensional image using the image data and the depth map.

2. The system according to claim 1,
further comprising a memory device,
wherein the memory device is configured to store the first filter and the plurality of filters,
wherein the memory device is configured to transmit the first filter to the first memory portion, and
wherein the memory device is configured to transmit the plurality of filters to the second memory portion.

3. A system comprising:
an imaging device comprising a transistor including an oxide semiconductor layer which is configured to function as an active layer, an arithmetic circuit, and a memory device,
wherein the imaging device comprises an imaging portion, a first memory portion, and an arithmetic portion,
wherein the arithmetic circuit comprises a second memory portion,
wherein the imaging portion is configured to convert light reflected by an external object into image data, wherein the first memory portion is configured to store the image data, a first filter for performing first convolutional processing in a first layer of a first neural network, and a second filter for performing second convolutional processing in a first layer of a second neural network, wherein the arithmetic portion is configured to perform the first convolutional processing on the image data using the first filter to generate first data, wherein the arithmetic portion is configured to perform the second convolutional processing on the image data using the second filter to generate second data, wherein the second memory portion is configured to store the first data, the second data, and a plurality of filters for performing convolutional processing in a second layer and subsequent layers of the first neural network and convolutional processing in a fourth layer and subsequent layers of the second neural network, wherein the arithmetic circuit is configured to perform processing in the second layer and the subsequent layers of the first neural network using the first data to output third data from an output layer of the first neural network, wherein the arithmetic circuit is configured to perform pooling processing on the second data in the second layer of the second neural network to generate fourth data, wherein the arithmetic circuit is configured to combine the third data and the fourth data in a third layer of the second neural network to generate fifth data, wherein the arithmetic circuit is configured to perform processing in the fourth layer and subsequent layers of the second neural network using the fifth data to output a depth map of the image data from an output layer of the second neural network, wherein the arithmetic circuit is configured to determine an image using the image data obtained through the convolutional processing and the pooling processing in a fully connected layer of the second neural network, and wherein the fully connected layer has a structure in which all nodes in one layer are connected to all nodes in a subsequent layer;

wherein the arithmetic circuit is configured to generate a three-dimensional image using the image data and the depth map.

4. The system according to claim 3,
wherein the memory device
is configured to store the first filter, the second filter, and the plurality of filters,
wherein the memory device is configured to transmit the first filter and the second filter to the first memory portion, and
wherein the memory device is configured to transmit the plurality of filters to the second memory portion.

5. The system according to claim 3, wherein the image data output from a pooling layer of the second neural network is a two-dimensional feature map and is unfolded into a one-dimensional feature map when input into the fully connected layer of the second neural network.

* * * * *